(12) United States Patent
Cho et al.

(10) Patent No.: US 11,995,148 B2
(45) Date of Patent: May 28, 2024

(54) ELECTRONIC APPARATUS FOR PERFORMING DECONVOLUTION CALCULATION AND CONTROLLING METHOD THEREOF

(71) Applicant: Samsung Electronics Co., Ltd., Gyeonggi-do (KR)

(72) Inventors: Youngrae Cho, Gyeonggi-do (KR); Kiseok Kwon, Gyeonggi-do (KR); Chulsoo Park, Gyeonggi-do (KR); Jongho Kim, Gyeonggi-do (KR); Jaeun Park, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 811 days.

(21) Appl. No.: 17/108,342

(22) Filed: Dec. 1, 2020

(65) Prior Publication Data
US 2021/0248475 A1   Aug. 12, 2021

(30) Foreign Application Priority Data
Feb. 11, 2020  (KR) ........................ 10-2020-0016439

(51) Int. Cl.
*G06F 17/15* (2006.01)
*G06F 9/345* (2018.01)
(Continued)

(52) U.S. Cl.
CPC .......... *G06F 17/153* (2013.01); *G06F 9/3455* (2013.01); *G06F 12/08* (2013.01); *G06N 3/084* (2013.01)

(58) Field of Classification Search
None
See application file for complete search history.

(56) References Cited

U.S. PATENT DOCUMENTS 9,235,874 B2   1/2016   Voronov et al.
9,652,829 B2   5/2017   Yang et al.
(Continued)

FOREIGN PATENT DOCUMENTS

CN   108805266   11/2018
CN   109993274   1/2021
(Continued)

OTHER PUBLICATIONS

Jiale Yan et al., "GNA: Reconfigurable and Efficient Architecture for Generative Network Acceleration" . . . IEEE Transactions on Computer-Aided Design of Integrated Circuits and Systems, vol. 37, No. 11, Nov. 2018, pp. 2519-2529.
(Continued)

*Primary Examiner* — Edward J Dudek, Jr.
*Assistant Examiner* — Ralph A Verderamo, III
(74) *Attorney, Agent, or Firm* — The Farrell Law Firm, P.C.

(57) ABSTRACT

Disclosed is an electronic apparatus including a processor configured to obtain calculation information based on input data of a deconvolution calculation being input, obtain a size of output data based on the obtained calculation information, obtain a plurality of memory address values corresponding to a size of the output data using an address generation module, perform convolution calculation based on the calculation information using a convolution calculation module to obtain an intermediate value in the convolution calculation process, obtain a memory address value corresponding to the obtained intermediate value of the plurality of obtained memory addresses using the address generation module, store the obtained intermediate value in the memory address value corresponding to the intermediate value, accumulate at least one intermediate value based on the memory address value corresponding to the intermediate value using
(Continued)

a cumulative calculation module, and obtain a deconvolution calculation value with respect to the input data based on the accumulated at least one intermediate value.

20 Claims, 30 Drawing Sheets

(51) Int. Cl.
*G06F 12/08* (2016.01)
*G06N 3/084* (2023.01)

(56) References Cited

U.S. PATENT DOCUMENTS

| | | |
|---|---|---|
| 11,010,661 B2 | 5/2021 | Li et al. |
| 11,074,492 B2 | 7/2021 | Lele et al. |
| 2018/0046900 A1 | 2/2018 | Dally et al. |
| 2018/0197084 A1 | 7/2018 | Kim |
| 2018/0315155 A1 | 11/2018 | Park et al. |
| 2019/0138898 A1 | 5/2019 | Song et al. |
| 2019/0251424 A1 | 8/2019 | Zhou et al. |
| 2019/0370692 A1 | 12/2019 | Cho et al. |
| 2020/0380345 A1 | 12/2020 | Li et al. |
| 2021/0097375 A1* | 4/2021 | Huynh ................ G06F 7/50 |

FOREIGN PATENT DOCUMENTS

| | | |
|---|---|---|
| EP | 3 557 425 | 10/2019 |
| KR | 1020180083030 | 7/2018 |
| KR | 1020190051697 | 5/2019 |
| KR | 1020190136891 | 12/2019 |

OTHER PUBLICATIONS

Xinyu Zhang et al., "A Design Methodology for Efficient Implementation of Deconvolutional Neual Networks on an FPGA", arXiv:1705.02583v1, May 7, 2017, 7 pages.

Dawen Xu et al., "FCN-Engine: Accelerating Deconvolutional Layers in Classic CNN Processors", IEEE/ACM International Conference on Computer-Aided Design, Nov. 5-8, 2018, 6pgs.

Jung-Woo Chang et al., "Towards Design Methodology of Efficient Fast Algorithms for Accelerating Generative Adversarial Networks on FPGAs", Jan. 13-16, 2020, 6 pages.

International Search Report dated Apr. 13, 2021 issued in counterpart application No. PCT/KR2020/018645, 7 pages.

Amir Yazdanbakhsh et al., "GANAX: A Unified MIMID-SIMD Acceleration for Generative Adversarial Networks", XP058416419, Jun. 2, 2018, 12 pages.

European Search Report dated Feb. 3, 2023 issued in counterpart application No. 20918783.0-1203, 10 pages.

* cited by examiner

FIG. 6 convolution ( c , w ) = i
  200        201 202   203 transposed convolution ( i , w ) = c
  600                    203 202   201

2805 — $O^*[x + i][y + j] = I[x][y] * W[F_W - i][F_H - j]$
$i \in \{0, 1, \ldots, (F_W-1)\}$    $j \in \{0, 1, \ldots, (F_H-1)\}$ 2810 — $O^*\left[\frac{x+i}{STR\_X}\right]\left[\frac{y+j}{STR\_Y}\right] = I[x][y] * W[F_W - i][F_H - j]$ 2815 — $O^*[x + STR\_X + i][y + STR\_Y + j] = I[x][y] * W[i][j]$
$i \in \{0, 1, \ldots, (F_W-1)\}$    $j \in \{0, 1, \ldots, (F_H-1)\}$

ELECTRONIC APPARATUS FOR PERFORMING DECONVOLUTION CALCULATION AND CONTROLLING METHOD THEREOF

CROSS-REFERENCE TO RELATED APPLICATIONS

This application is based on and claims priority under 35 U.S.C. § 119 to Korean Patent Application No. 10-2020-0016439, filed on Feb. 11, 2020, in the Korean Intellectual Property Office, the disclosure of which is incorporated by reference herein in its entirety.

BACKGROUND

1. Field

The disclosure relates generally an electronic apparatus, and more particularly, to an electronic apparatus performing deconvolution calculation and a method for controlling thereof.

2. Description of Related Art

Super resolution (SR) may refer to converting an image of a low resolution into an image of a high resolution. An artificial intelligence (AI) model can be used in performing the SR operation and can include a convolution layer, a non-linear layer, and an upscaling layer.

A hardware accelerator (HWA) supporting the SR network can include hardware for performing a convolution operation, hardware supporting a layer composed of a non-linear function, and hardware that is responsible for upscaling.

A method of upscaling can vary depending on a calculation method or an implementation method. When configuring separate hardware according to upscaling methods, however, a problem tends to occur in which an excessively large area becomes occupied by hardware. Furthermore, an electronic apparatus including hardware performing a convolution calculation operation can have separate hardware to perform a deconvolution calculation operation. Therefore, a problem tends to occur in that an electronic apparatus should assign a large area to have hardware for performing both the convolution calculation operation and the deconvolution calculation operation.

Accordingly, there is a need in the art for a method and electronic apparatus to minimize the area occupied by the hardware in an embedded environment.

SUMMARY

This disclosure is provided to address at least the above-mentioned problems and/or disadvantages and to provide at least the advantages described below.

Accordingly, an aspect of the disclosure is to provide an electronic apparatus for obtaining a result value of deconvolution calculation through a convolution calculation process and a method for controlling thereof.

In accordance with an aspect of the disclosure, an electronic apparatus includes a memory, and a processor connected to the memory configured to control the electronic apparatus, wherein the processor is configured to obtain calculation information based on input data of a deconvolution calculation being input, obtain a size of output data based on the obtained calculation information, obtain a plurality of memory address values corresponding to a size of the output data using an address generation module, perform convolution calculation based on the calculation information using a convolution calculation module to obtain an intermediate value in the convolution calculation process, obtain a memory address value corresponding to the obtained intermediate value of the plurality of obtained memory addresses using the address generation module, store the obtained intermediate value in the memory address value corresponding to the intermediate value, accumulate at least one intermediate value based on the memory address value corresponding to the intermediate value using a cumulative calculation module, and obtain a deconvolution calculation value with respect to the input data based on the accumulated at least one intermediate value.

In accordance with another aspect of the disclosure, a method of controlling an electronic apparatus includes obtaining calculation information based on input data of deconvolution calculation being input, obtaining a size of output data based on the obtained calculation information, obtaining a plurality of memory address values corresponding to a size of the output data using an address generation module, performing convolution calculation based on the calculation information using a convolution calculation module in the convolution calculation process to obtain an intermediate value in the convolution calculation process, obtaining a memory address value corresponding to the obtained intermediate value of the plurality of obtained memory addresses using the address generation module, storing the obtained intermediate value in the memory address value corresponding to the intermediate value, accumulating at least one intermediate value based on the memory address value corresponding to the intermediate value using a cumulative calculation module, and obtaining a deconvolution calculation value with respect to the input data based on the accumulated at least one intermediate value.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 6 illustrates convolution calculation and deconvolution calculation according to an embodiment;

FIG. 10 illustrates a partial operation of the deconvolution calculation operation of FIG. 7;

FIG. 11A illustrates a partial operation of the deconvolution calculation operation of FIG. 7;

FIG. 11B illustrates a partial operation of the deconvolution calculation operation of FIG. 7;

FIG. 28 illustrates a mathematical equation used in convolution calculation or deconvolution calculation according to an embodiment.

DETAILED DESCRIPTION

Figure 1:
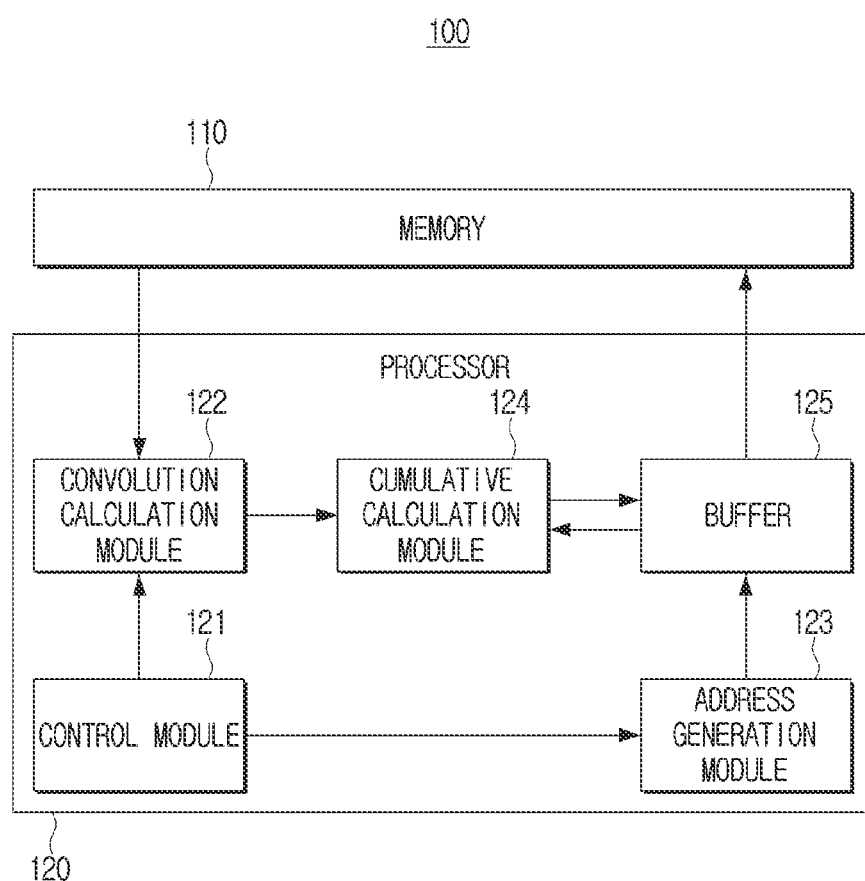
FIG. 1 is a block diagram illustrating an electronic apparatus according to an embodiment.

The disclosure will be described in greater detail with reference to the attached drawings. Detailed descriptions of known functions and/or configurations will be omitted for the sake of clarity and conciseness.

The terms used in the present specification and the claims are general terms identified in consideration of the functions of embodiments of the disclosure. However, these terms may vary depending on intention, legal or technical interpretation, emergence of new technologies, and the like of those skilled in the related art. Some terms may be arbitrarily defined herein. Unless there is a specific definition of a term, the term may be construed based on the overall contents and technological common sense of those skilled in the related art.

Expressions such as "have," "may have," "include," "may include" or the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of importance or order, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor.

In the following description, a "user" may refer to a person using an electronic apparatus or an artificial intelligence electronic apparatus using an electronic apparatus.

A computation in the disclosure can be performed by a recognition system based on machine learning, and a deep-learning recognition is described as an example of a classification system by a series of machine learning algorithms based on neural networks.

The recognition system based on deep learning may include at least one classifier that may correspond to one or a plurality of processors. A processor may be implemented as an array of a plurality of logic gates and in a combination of a general microprocessor and a memory in which a program that can be executed in the microprocessor is stored.

The classifier can be implemented as a neural network-based classifier, a support vector machine (SVM), an Adaboost classifier, a Bayesian classifier, a Perceptron classifier, or the like. The classifier will be described with respect to an embodiment implemented as a classifier based on convolutional neural network (CNN). The neural network-based classifier is a calculation model implemented to simulate the computational capacity of a biological system by using a large number of artificial neurons connected by a connection line, and may perform a human cognitive function or a learning process through a connection line having a connection strength (weight). However, the classifier of the disclosure is not limited thereto, and can be implemented with various classifiers.

A general neural network may include an input layer, a hidden layer, and an output layer, and the hidden layer can be composed of one or more layers as needed. In this case, a back propagation algorithm can be used as an algorithm for training the neural network.

If some data is input to the input layer of the neural network, the classifier can train the neural network so that the output data for the inputted learning data is output to the output layer of the neural network. When the feature information extracted from a captured image is input, a pattern of the feature information may be classified into any one class of the various classes using the neural network, and a classification result can be output.

The processor may use the recognition system based on deep learning as a classification system based on a series of machine learning algorithms of neural networks.

FIG. 1 is a block diagram illustrating an electronic apparatus according to an embodiment.

Referring to FIG. 1, an electronic apparatus 100 may include a memory 110 and a processor 120.

The electronic apparatus 100 may be a computer or a server including hardware performing a convolution calculation operation.

The memory 110 may be implemented as an internal memory such as a read-only memory (ROM), such as electrically erasable programmable read-only memory (EEPROM), and a random-access memory (RAM) or a memory separate from the processor 120. In this case, the memory 110 may be implemented as at least one of a memory embedded within the electronic apparatus 100 or a memory detachable from the electronic apparatus 100 according to the usage of data storage. For example, the data for driving the electronic apparatus 100 may be stored in the memory embedded within the electronic apparatus 100, and the data for upscaling of the electronic apparatus 100 may be stored in the memory detachable from the electronic apparatus 100.

The memory 110 embedded in the electronic apparatus 100 may be implemented as at least one of a volatile memory such as a dynamic random access memory (DRAM), a static random access memory (SRAM), a synchronous dynamic random access memory (SDRAM), or a non-volatile memory, such as one time programmable ROM (OTPROM), programmable ROM (PROM), erasable and programmable ROM (EPROM), electrically erasable and programmable ROM (EEPROM), mask ROM, flash ROM, a flash memory, such as NAND flash or NOR flash), a hard disk drive (HDD) or a solid state drive (SSD). In the case of a memory detachably mounted to the electronic apparatus 100, the memory may be implemented as a memory card, such as a compact flash (CF), secure digital (SD), micro secure digital (micro-SD), mini secure digital (mini-SD), extreme digital (xD), or multi-media card (MMC), and an external memory, such as a universal serial bus (USB) memory connectable to the USB port.

The processor 120 may perform overall control operations of the electronic apparatus 100.

The processor 120 may be implemented with at least one of a digital signal processor (DSP), a microprocessor, and a time controller (TCON), a central processing unit (CPU), a micro controller unit (MCU), a micro processing unit, a controller, an application processor (AP), a communication processor (CP), and an advanced reduced instruction set computing (RISC) machine (ARM) processor or may be defined as a corresponding term. The processor 120 may be implemented in a system on chip (SoC) type or a large scale integration (LSI) type in which a processing algorithm is built therein or in a field programmable gate array (FPGA) type. The processor 120 may perform various functions by executing computer executable instructions stored in the memory 110.

The processor 120 can include at least one of a control module 121, a convolution calculation module 122, an address generation module 123, a cumulative calculation module 124, and a buffer 125.

The control module 121 can obtain the calculation information and convey the calculation information to the convolution calculation module 122 or the address generation module 123.

The calculation information may include at least one of a type of calculation, input data, filter data, or stride.

The type of calculation can refer to a convolution calculation or a deconvolution calculation (or a transposed convolution calculation).

The input data may refer to target data for which calculation is performed.

The filter data may indicate kernel data and can be data used to change the size of the input data. Also, the filter data can include at least one weight.

The stride may refer to a movement interval used in performing convolution calculation.

The convolution calculation module 122 may perform convolution calculation based on the received calculation information. The convolution calculation module 122 may perform all convolution calculations to obtain one calculation result value. The convolution calculation module 122 may perform a convolution calculation among a plurality of convolution calculations to obtain one intermediate value and transmit the obtained one intermediate value to the cumulative calculation module 124.

The address generation module 123 may generate and managing an address value of a memory or a buffer. The convolution calculation result value or the deconvolution calculation result value can be stored in an address value of a specific memory, and the intermediate values obtained before a final calculation result value can be stored in a buffer. The address generation module 123 may generate and manage an address value of a buffer or an address value of a memory in which an intermediate value (or a calculation result value) is stored.

The cumulative calculation module 124 can perform a calculation of accumulation by adding a new value to an existing value. Specifically, the cumulative calculation module 124 can accumulate the value already stored in the buffer 125 and the newly received value in the convolution calculation module 122 and transmit the accumulated new value to the buffer 125.

The buffer 125 may be configured to store data temporarily. The buffer 125 can temporarily store the partial sums (or accumulated sums) before the calculation result is finalized and can transmit the stored partial sum to the cumulative calculation module 124 or the memory 110 as needed.

The processor 120 may be connected to the memory 110 to control the electronic apparatus 100. The overall control operation of the processor 120 can be performed by the control module 121. In the following description, the processor 120 may be described, rather than the control module 121 for convenience of description.

When the input data of deconvolution calculation is input, the processor 120 may obtain calculation information, obtain a size of output data based on the obtained calculation information, obtain a plurality of memory address values corresponding to the size of the output data using the address generation module 123, perform convolution calculation based on the calculation information using the convolution calculation module 122 to obtain an intermediate value in the convolution calculation process, obtain a memory address value corresponding to the obtained intermediate value of the plurality of memory address values using the address generation module 123, store the obtained intermediate value in a memory address value corresponding to the intermediate value, accumulate at least one intermediate value based on the memory address value corresponding to the intermediate value using the cumulative calculation module 124, and obtain a deconvolution calculation value for the input data based on at least one accumulated intermediate value.

The processor 120 can receive input data of a deconvolution calculation to obtain the calculation information of the deconvolution calculation, which calculation information can include data necessary for performing a deconvolution calculation. The calculation information may include at least one of the size of the input data, the size of the filter data used for the deconvolution calculation, the size of the stride used in the convolution calculation, and the calculation order information corresponding to a first intermediate value.

The processor 120 can obtain the size of the output data based on the obtained calculation information. Accordingly, the size of the output data can be changed when the calculation information is changed. The size of the input data and the size of the output data can refer to the size of a matrix forming input data and output data, such as 3*3 or 4*4.

The processor 120 can obtain a memory address value corresponding to the size of the output data obtained by using the address generation module 123. The processor 120 can first obtain a memory address value to store the output data before obtaining a specific value of the output data. The obtained memory address value can be plural.

The deconvolution calculation can be a sum of the intermediate result values of the plurality of convolutional calculations. When the deconvolution calculation is divided, it may be composed of a plurality of convolutional calculations. Accordingly, the processor 120 can perform a plurality of convolution calculations to obtain a deconvolution calculation value and obtain an intermediate value in a plurality of convolution calculation processes. The processor 120 can obtain one intermediate value in one convolution calculation.

The processor 120 can obtain a memory address value corresponding to the obtained intermediate value from the plurality of obtained memory address values based on the calculation information. Since the calculation information includes data required for the calculation, the processor 120 can identify that obtained intermediate value corresponds to which memory address value based on the calculation order. The processor 120 can store the obtained intermediate value in a memory address value corresponding to the obtained intermediate value.

The processor 120 can perform an accumulation operation using the cumulative calculation module 124. Specifically, the cumulative operation may indicate a process of adding an intermediate value. Based on the calculation information, the processor 120 can perform a plurality of convolution calculation operations and obtain a plurality of intermediate values. There may be an intermediate value having the same memory address value corresponding to each intermediate value. If the memory address value is identical to the corresponding intermediate value, the intermediate value can be accumulated by new intermediate value. If there is one intermediate value having the same address value, an accumulation operation may not be performed in the corresponding memory address value.

When all of the accumulation operation is completed, the processor 120 may obtain the final deconvolution calculation value based on the value stored in the memory address.

The processor 120 may obtain a first memory address value or a second memory address value based on calculation information using the address generation module 123.

The first memory address value can correspond to the first intermediate value obtained during the first convolution calculation process. The processor 120 can obtain a first memory address value corresponding to the first intermediate value obtained of the plurality of memory address values obtained based on the calculation order information corresponding to the first intermediate value. The processor 120 can store the first intermediate value in the memory 110 based on the first memory address value.

The second memory address value may correspond to the second intermediate value obtained during the second convolution calculation process. The processor 120 may obtain a second memory address value corresponding to the second intermediate value obtained from of the plurality of memory address values obtained based on the calculation order information corresponding to the second intermediate value. The processor 120 may store the second intermediate value in the memory 110 based on the second memory address value.

If the second memory address value corresponding to the second intermediate value obtained during the second convolution calculation is identical to the first memory address value, the processor 120 may accumulate the first intermediate value and the second intermediate value using the cumulative calculation module 124 to obtain the partial sum, and store the obtained partial sum in the memory 110 based on the first memory address value.

If the second memory address value corresponding to the second intermediate value obtained during the second convolution calculation is not identical to the first memory address value, the processor 120 can store the second intermediate value in the second memory address value. If the second intermediate value is stored in the second memory address value, the first intermediate value and the second intermediate value may not be accumulated.

The processor 120 may perform convolution calculation sequentially for input data with a plurality of values (weights) included in a horizontal line of the filter data used for the deconvolution calculation to obtain a plurality of intermediate values. The processor 120 does not use the filter data only in the horizontal axis line, but may preferentially use the filter data corresponding to the horizontal axis line between the horizontal axis line and the vertical axis line. The filter data may be in the form of a matrix including a plurality of rows (transverse lines) and a plurality of columns (longitudinal lines). The processor 120 may perform a convolution calculation with respect to a row in the weight stored in the form of a matrix.

The filter data may be composed of a matrix and may include data arranged on the basis of the horizontal axis line (row) and the longitudinal axis line (column). For example, the filter data may be 3*3 size, including w0 (1,1), w1 (1,2), w2 (1,3) in the first row (row 1), w3 (2,1), w4 (2,2), w5 (2,3) in the second row (row 2), and w6 (3,1), w7 (3,2), w8 (3,3) in the third row (row 3). The processor 120 may perform a convolution calculation sequentially with respect to the horizontal axis (row), in order of w0 (1,1), w1 (1,2), and w2 (1,3). That is, the processor 120 may first use the filter data corresponding to first row of the filter data, and then use the filter data corresponding to the second row and the third row.

The convolution calculation is performed with respect to the horizontal axis in order to efficiently manage the partial sum. If the convolution calculation is performed with respect to the horizontal axis, a final partial sum corresponding to the memory address value can be obtained by a minimum calculation. Therefore, if the finally obtained partial sum is confirmed, the buffer can no longer be used, thereby enhancing the memory management efficiency. A detailed description thereof will be provided later in FIG. 8.

The processor 120 may accumulate at least some of the plurality of intermediate values using the cumulative calculation module 124, and the number of accumulation iterations may be calculated (or obtained) based on the calculation information.

The processor 120 may store the intermediate value in the internal buffer 125 based on the address value of the internal buffer 125 corresponding to the intermediate value, identify whether there is an additional intermediate value to be accumulated in the intermediate value, and store the intermediate value stored in the internal buffer 125 in the memory 110 if it is identified that there is no additional intermediate value.

The processor 120 may determine the size of the internal buffer in which the intermediate value is to be stored based on the calculation information. The size of the internal buffer may be fixed. However, for efficient management of the memory, the processor 120 may determine the size of the internal buffer based on the calculation information. Specifically, the larger the size of the input data, the larger the size of the internal buffer. A detailed description of the buffer and the like will be provided later with reference to FIGS. 19 and 20.

The obtained deconvolution calculation value can be obtained without using a deconvolution calculation module. Through the above description, it has been described that the deconvolution calculation is composed of a plurality of convolution calculation operations. Accordingly, the electronic apparatus 100 can obtain the deconvolution calculation value using only the conventional convolution calculation module. The electronic apparatus 100 may not include hardware only for deconvolution calculation and may perform a deconvolution calculation using only the conventional convolution calculation module 122. Thus, the electronic apparatus 100 may require less space for a calculation hardware as compared to an electronic apparatus that includes both hardware for a convolution calculation and a deconvolution calculation. Therefore, since the electronic apparatus 100 requires less hardware space than other electronic apparatuses, the space efficiency can be maximized.

Figure 2:
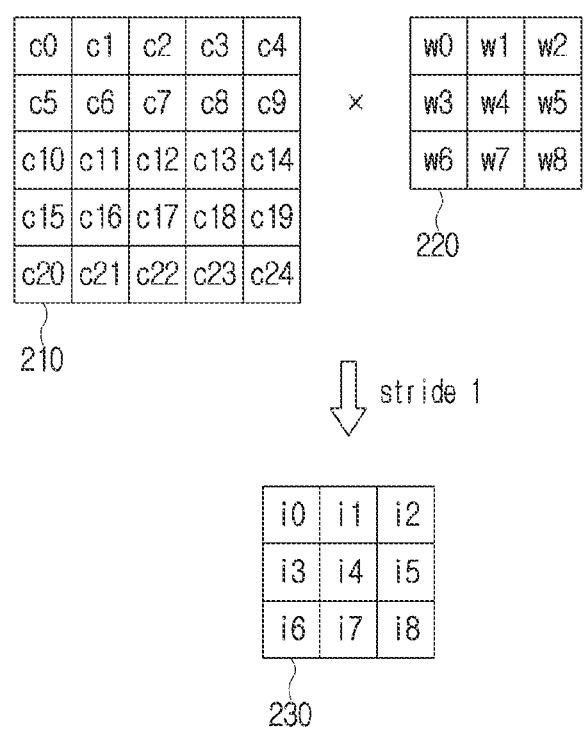
FIG. 2 illustrates a convolution calculation operation according to an embodiment.

FIG. 2 illustrates a convolution calculation operation according to an embodiment.

Referring to FIG. 2, the electronic apparatus 100 may perform a convolution calculation on input data 210 in a size of 5*5 and filter data 220 in a size of 3*3. The input data 210 may have a value from C0 to C24, and the filter data 220 may have a value from w0 to w8. In FIG. 2, stride is assumed to be 1. The electronic apparatus 100 may obtain the final output data 230 of the convolution calculation based on the input data 210, the filter data 220, and the stride. The size of the final output data of the convolution calculation may be 3*3.

Figure 3:
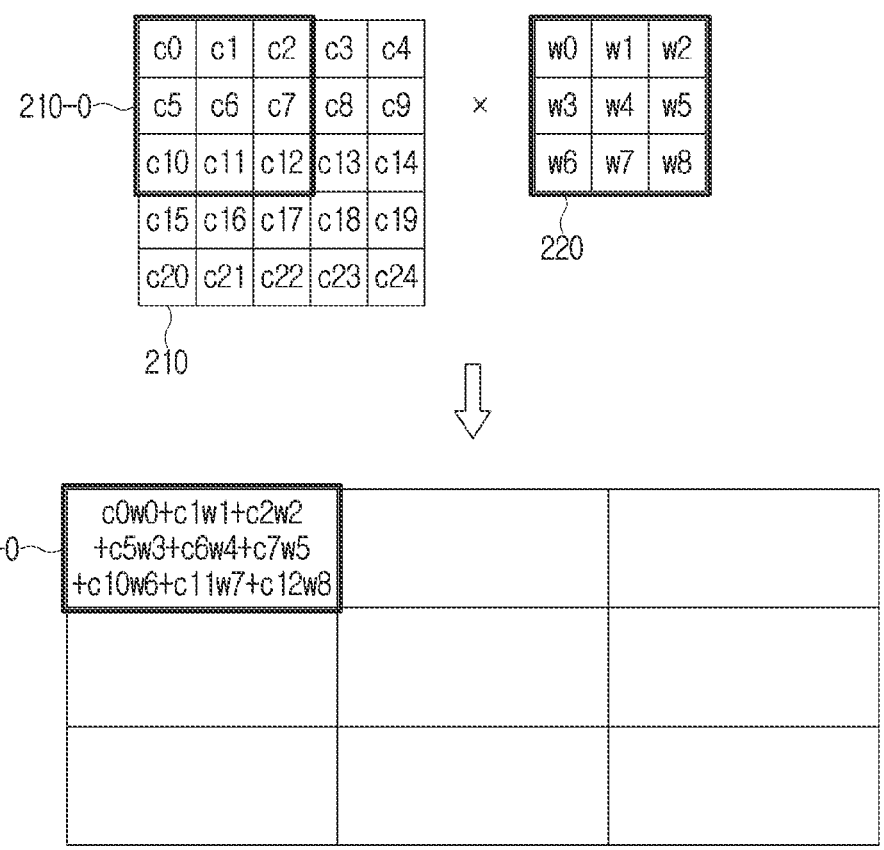
FIG. 3 illustrates a partial operation of the convolution calculation operation of FIG. 2.

FIG. 3 illustrates a partial operation of the convolution calculation operation of FIG. 2.

Referring to FIG. 3, in order to perform the convolution calculation of the embodiment of FIG. 2, the electronic apparatus 100 may perform a convolution calculation operation on the partial data 210-0 of the input data 210 and the filter data 220 to obtain the partial data 230-0 of the output data 230.

Figure 4:
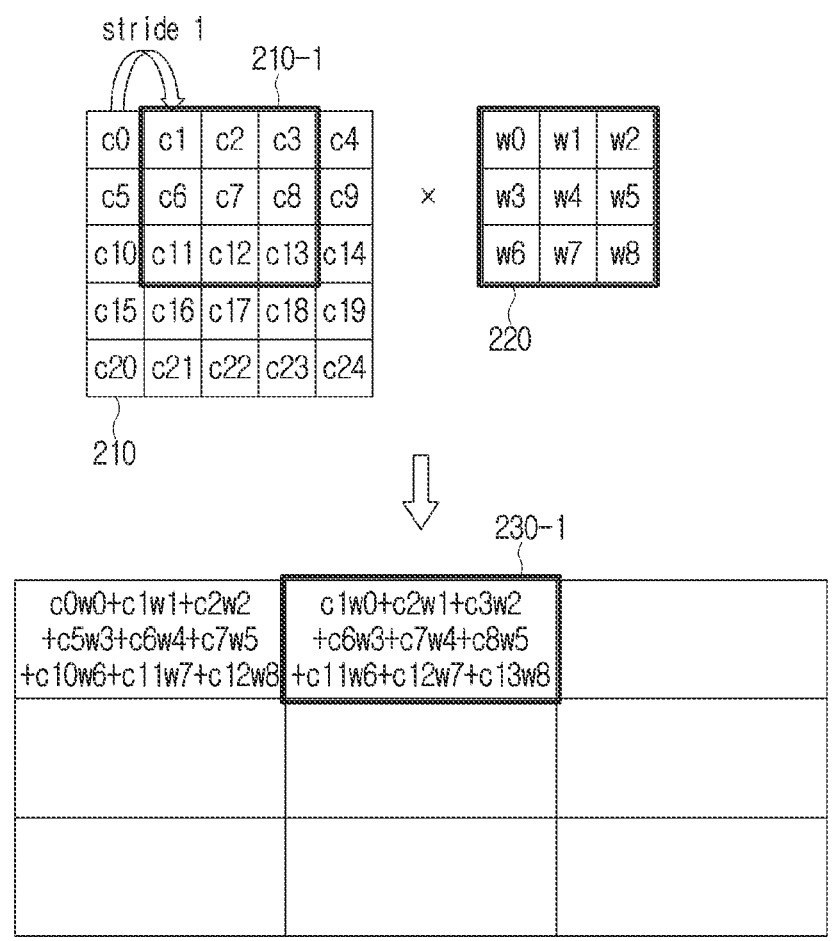
FIG. 4 illustrates a partial operation of the convolution calculation operation of FIG. 2.

FIG. 4 illustrates a partial operation of the convolution calculation operation of FIG. 2.

Referring to FIG. 4, after the calculation of FIG. 3, the electronic apparatus 100 may move by a stride of 1 to perform a next convolution calculation operation. Specifically, the electronic apparatus 100 may perform a convolution calculation operation on partial data 210-1 of the input data 210 and the filter data 220 to obtain partial data 230-1 of the output data 230.

Figure 5:
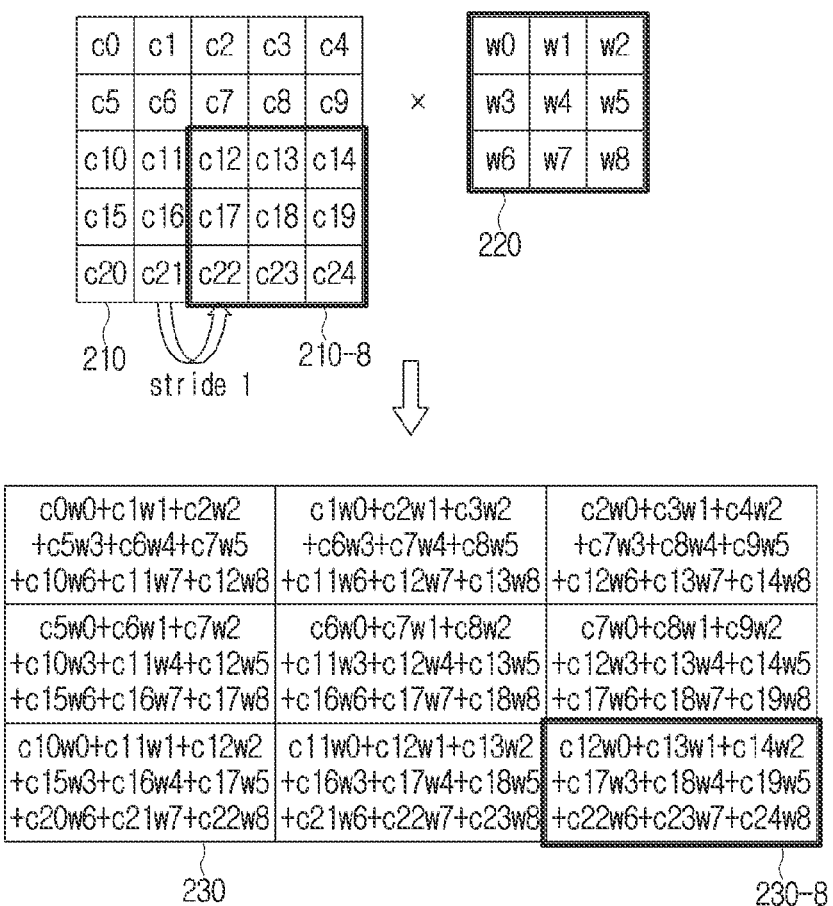
FIG. 5 illustrates a partial operation of the convolution calculation operation of FIG.

FIG. 5 illustrates a partial operation of the convolution calculation operation of FIG. 2.

Referring to FIG. 5, after the calculation of FIG. 4, the electronic apparatus 100 can move by stride 1 to perform a plurality of convolutional calculation operations, and the last calculation operation of a plurality of calculation operations is illustrated. Specifically, the electronic apparatus 100 may perform a convolution calculation operation with partial data 210-8 of the input data 210 and the filter data 220 to obtain partial data 230-8 of the output data 230.

The electronic apparatus 100 may finally obtain the output data 230 of FIG. 5, and the output data 230 of FIG. 5 may be a final result value of the convolution calculation.

Referring to FIGS. 2, 3, 4 and 5, stride may be 1, but output data of different sizes can be generated depending on the size of the stride. The input data 210 and the filter data 220 used in the convolution calculation operation are only an example, and various sizes of data can be applied.

The input data, filter data, and output data illustrated in FIGS. 2, 3, 4 and 5 may refer to input data of a convolution calculation, filter data of a convolution calculation, and output data of a convolution calculation.

FIG. 6 illustrates convolution calculation and deconvolution calculation, according to an embodiment.

Referring to FIG. 6, the convolution calculation 200 can refer to obtaining the output data 203 based on the input data 201 of the convolution calculation and the filter data 202. Deconvolution calculation 600 can refer to performing the inverse process of the convolution calculation. Specifically, the deconvolution calculation 600 can refer to obtaining the input data 201 of the convolution calculation based on the output data 203 of the convolution calculation and the filter data 202 of the convolution calculation.

In describing the deconvolution calculation 600, the output data 203 of the convolution calculation may indicate the input data of the deconvolution calculation, and the input data 201 of the convolution calculation may indicate the output data of the deconvolution calculation.

The deconvolution calculation 600 may be transposed convolution calculation.

Figure 7:
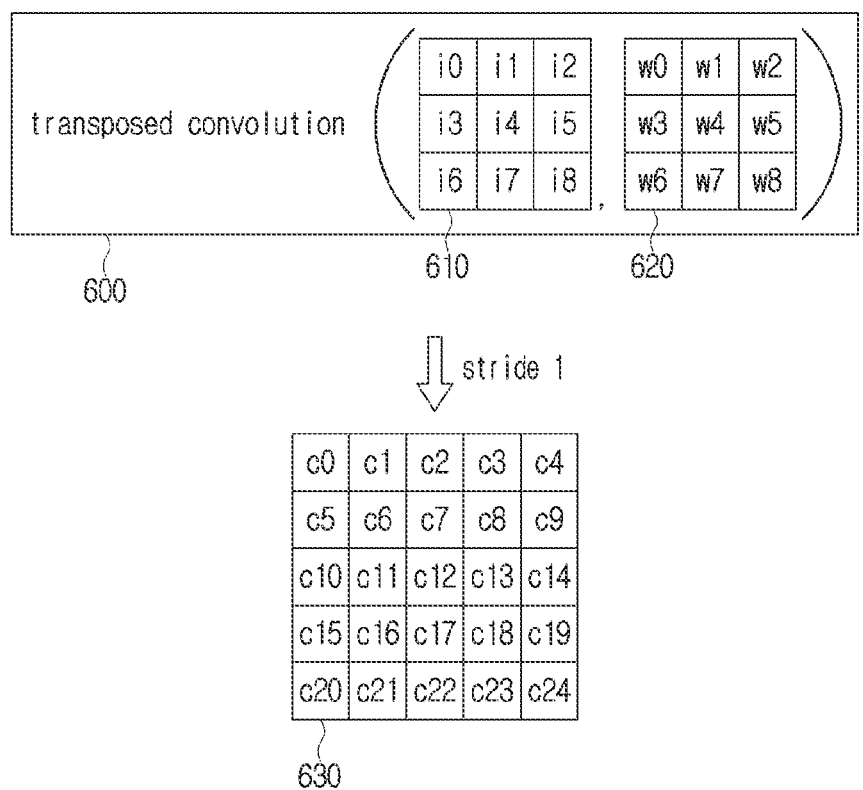
FIG. 7 illustrates a deconvolution calculation operation according to an embodiment.

FIG. 7 illustrates a deconvolution calculation operation according to an embodiment.

Referring to FIG. 7, the electronic apparatus 100 may perform a deconvolution calculation 600 (or a translated convolution calculation). Referring back to FIG. 2, the convolution calculation can be a process of obtaining the output data 230 of the convolution calculation based on the input data 210 of a convolution calculation, the filter data 220 of a convolution calculation, and stride 1. The deconvolution calculation can be a process of obtaining input data 210 of a convolution calculation based on the output data 230 of the convolution calculation, the filter data 220 of the convolution calculation, and stride 1.

The output data 230 of the convolution calculation can be input data 610 of the deconvolution calculation, the filter data 220 of the convolution calculation can be filter data 620 of the deconvolution calculation, and the input data 210 of the convolution calculation can be output data 630 of the deconvolution calculation.

The input data and the output data of FIGS. 7, 8, 9, 10, 11 and 12 may refer to the corresponding data of the deconvolution calculation.

Referring to FIG. 7, the electronic apparatus 100 may perform a deconvolution calculation based on the input data 610 of 3*3 size, filter data 620 of 3*3 size, and stride 1 to obtain the output data 630 of 5*5.

Figure 8:
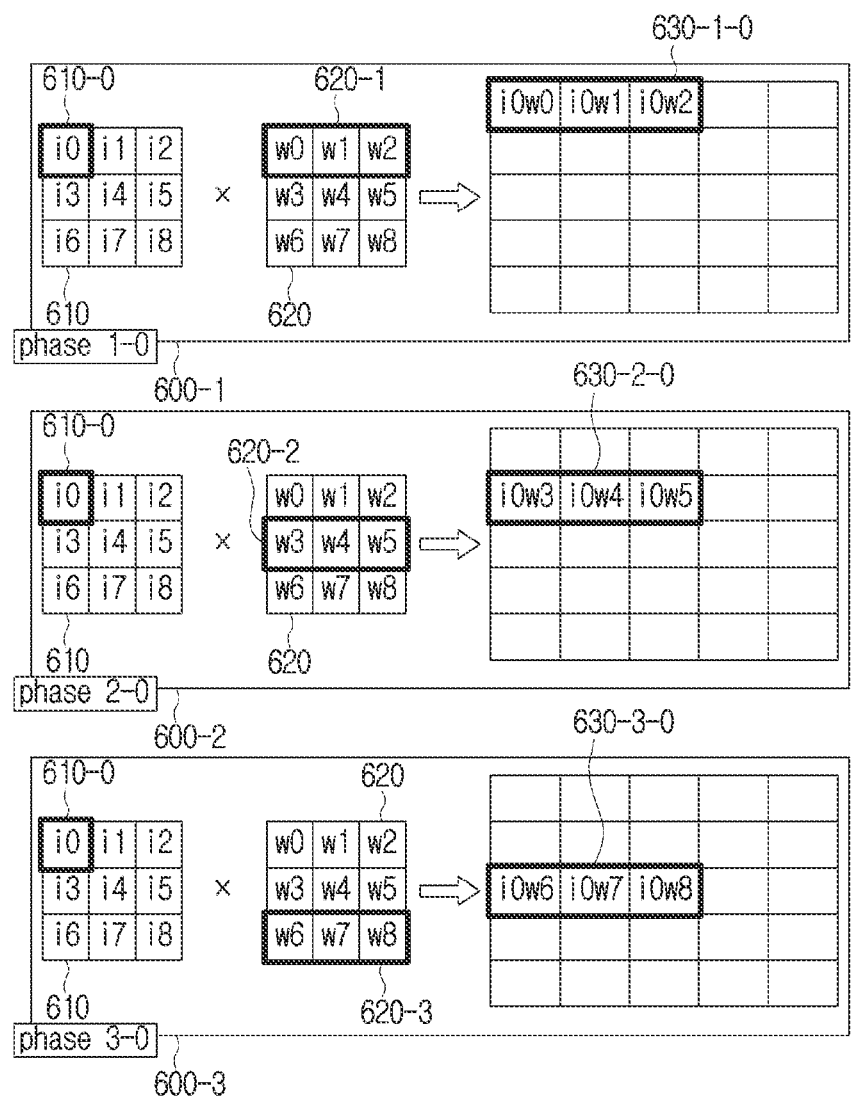
FIG. 8 illustrates a partial operation of the deconvolution calculation operation of FIG. 7.

FIG. 8 illustrates a partial operation of the deconvolution calculation operation of FIG. 7.

Referring to FIG. 8, the deconvolution calculation may divide the filter data 620 to perform a calculation operation. The electronic apparatus 100 may obtain a result value of the deconvolution calculation using a convolution calculation.

For example, the filter data 620 may be a 3*3 matrix and may have nine weights w0 to w8. The weights w0 to w8 included in the filter data 620 can be divided based on a row. The electronic apparatus 100 may classify weights (w0, w1, w2) corresponding to first row of the filter data 620 into a first group 620-1, the weights (w3, w4, w5) corresponding to the second row of the filter data 620 into a second group 620-2, and the weights (w6, w7, w8) corresponding to the third row of the filter data 620 into a third group 620-3. The electronic apparatus 100 may perform a convolution calculation of the input data 610 and the classified weight groups 620-1, 620-2, 620-3 to obtain the final resulting value of the deconvolution calculation.

The convolution calculation process of the input data 610 and the filter data 620 with the first group 620-1 may be described as first phase 600-1, the convolution calculation process of the input data 610 and the filter data 620 with the second group 620-2 as a second phase 600-2, and the convolution calculation process of the input data 610 and the filter data 620 with the third group 620-3 as a third phase 600-3.

Referring to FIG. 8, only i0 610-0 of the input data 610 will be described for conciseness.

The electronic apparatus 100 may perform a convolution calculation with the i0 610-0 and the first group 620-1 in the first phase 600-1 to obtain a plurality of intermediate values 630-1-0. The electronic apparatus 100 may perform a convolution calculation with the i0 610-0 and the second group 620-2 in the second phase 600-2 to obtain a plurality of intermediate values 630-2-0. The electronic apparatus 100 may perform a convolution calculation with the i0 610-0 and the third group 620-3 in the third phase 600-3 to obtain a plurality of intermediate values 630-3-0.

Referring to FIG. 8, the description of the first phase 600-1, the second phase 600-2, and the third phase 600-3 is to describe the calculation process for i0 610-0 and the overall calculation process of the deconvolution calculation according to each phase will be described later in FIGS. 9, 10, 11A and 11B.

The electronic apparatus 100 may identify a phase based on a row of the matrix of the filter data 620. The phase is classified based on a row in order to efficiently perform a data calculation. Consequently, the calculation of all data is the same, but the number of values waiting in the buffer can be reduced for the accumulation calculation, if the calculation is performed with priority on a row. If the number of values waiting in the buffer is reduced, efficient memory operation is available and the electronic apparatus 100 may reduce processing time and capacity.

Figure 9:
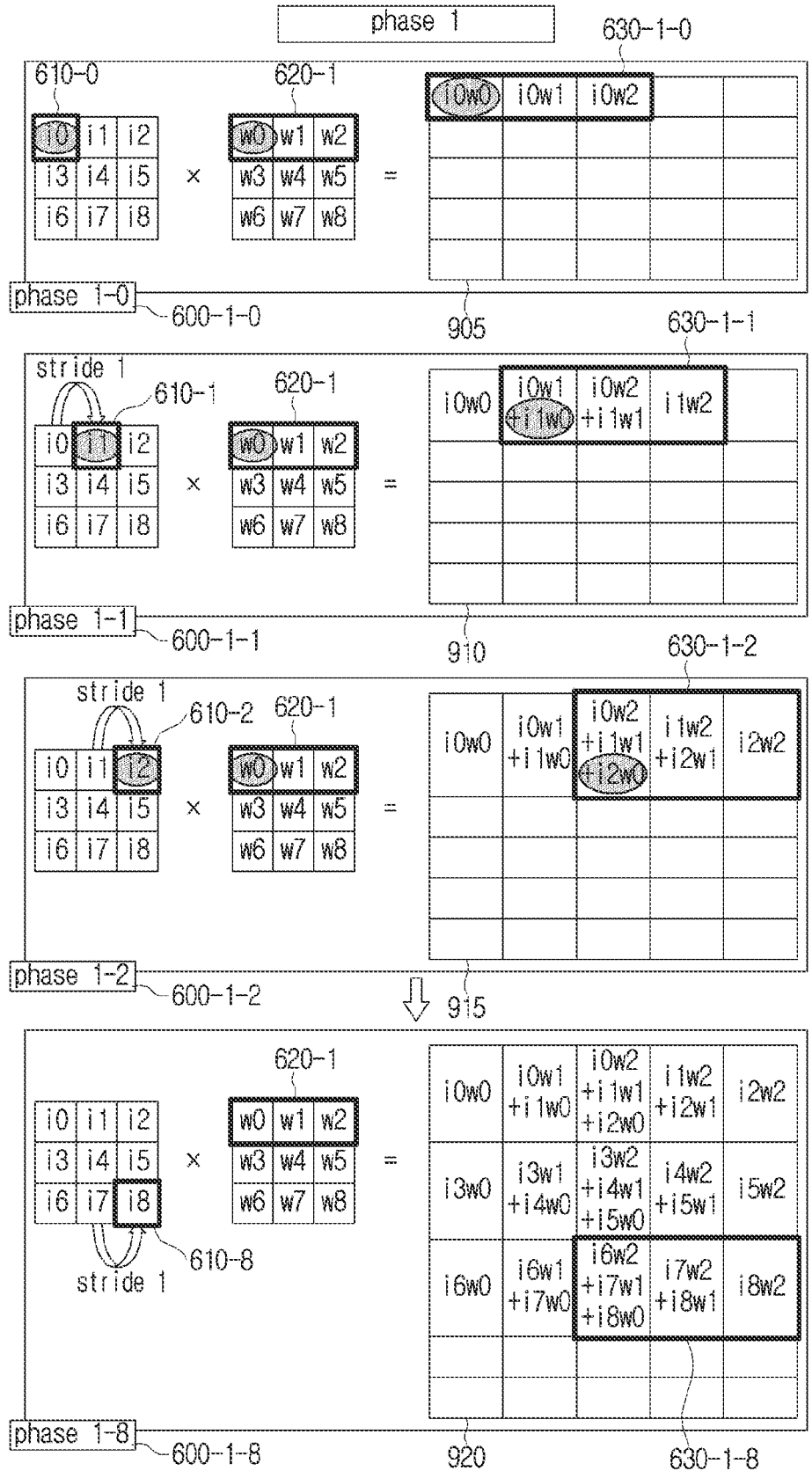
FIG. 9 illustrates a partial operation of the deconvolution calculation operation of FIG. 7.

FIG. 9 illustrates a partial operation of the deconvolution calculation operation of FIG. 7.

Referring to FIG. 9, the first phase 600-1 may be classified into nine steps 600-1-0 to 600-1-8 based on the input data 610.

In the zeroth step 600-1-0 (phase 1-0) of the first phase 600-1, the electronic apparatus 100 may perform a convolution calculation between the i0 610-0 and the first group 620-1 of the filter data 620 to obtain a plurality of intermediate values 630-1-0. The plurality of intermediate values 630-1-0 may include three intermediate values i0w0, i0w1, and i0w2 and may be stored in a predetermined order in a matrix 905.

In the first step 600-1-1 (phase 1-1) of the first phase 600-1, the electronic apparatus 100 may perform a convolution calculation between the i1 610-1 and the first group 620-1 of the filter data 620 to obtain a plurality of intermediate values 630-1-1. The plurality of intermediate values 630-1-1 may include three intermediate values i1w0, i1w1, and i1w2. The electronic apparatus 100 may accumulate and store the plurality of intermediate values 630-1-1 by moving in a right direction (row direction) by stride 1 from the matrix 905 where the plurality of intermediate values 630-1-0 are stored. The result of accumulating the plurality of intermediate values 630-1-1 may be a matrix 910.

In the second step 600-1-2 (phase 1-2) of the first phase 600-1, the electronic apparatus 100 may perform a convolution calculation between the i2 610-2 and the first group 620-1 of the filter data 620 to obtain a plurality of intermediate values 630-1-2. The plurality of intermediate values 630-1-2 may include three intermediate values i2w0, i2w1, and i2w2. In addition, the electronic apparatus 100 may newly accumulate and store the plurality of intermediate values 630-1-2 by moving in a right direction by stride 1 from the matrix 910 where the plurality of intermediate values 630-1-1 are accumulated. The result of accumulating the plurality of intermediate values 630-1-2 may be a matrix 915.

The third (600-1-3) to seventh (600-1-7) steps are repetitive and a description thereof will be omitted.

In the eighth step 600-1-8 (phase 1-8) of the first phase 600-1, the electronic apparatus 100 may perform a convolution calculation between i8 610-8 and the first group 620-1 of the filter data 620 to obtain a plurality of intermediate values 630-1-8. The plurality of intermediate values 630-1-8 may include three intermediate values i8w0, i8w1, and i8w2. The electronic apparatus 100 may accumulate and store the plurality of intermediate values 630-1-8 by moving in a right direction by stride 1 from the matrix in which the plurality of intermediate values i7w0, i7w1, and i7w2 are accumulated. The result of accumulating the plurality of intermediate values 630-1-8 may be a matrix 920.

Figure 10:
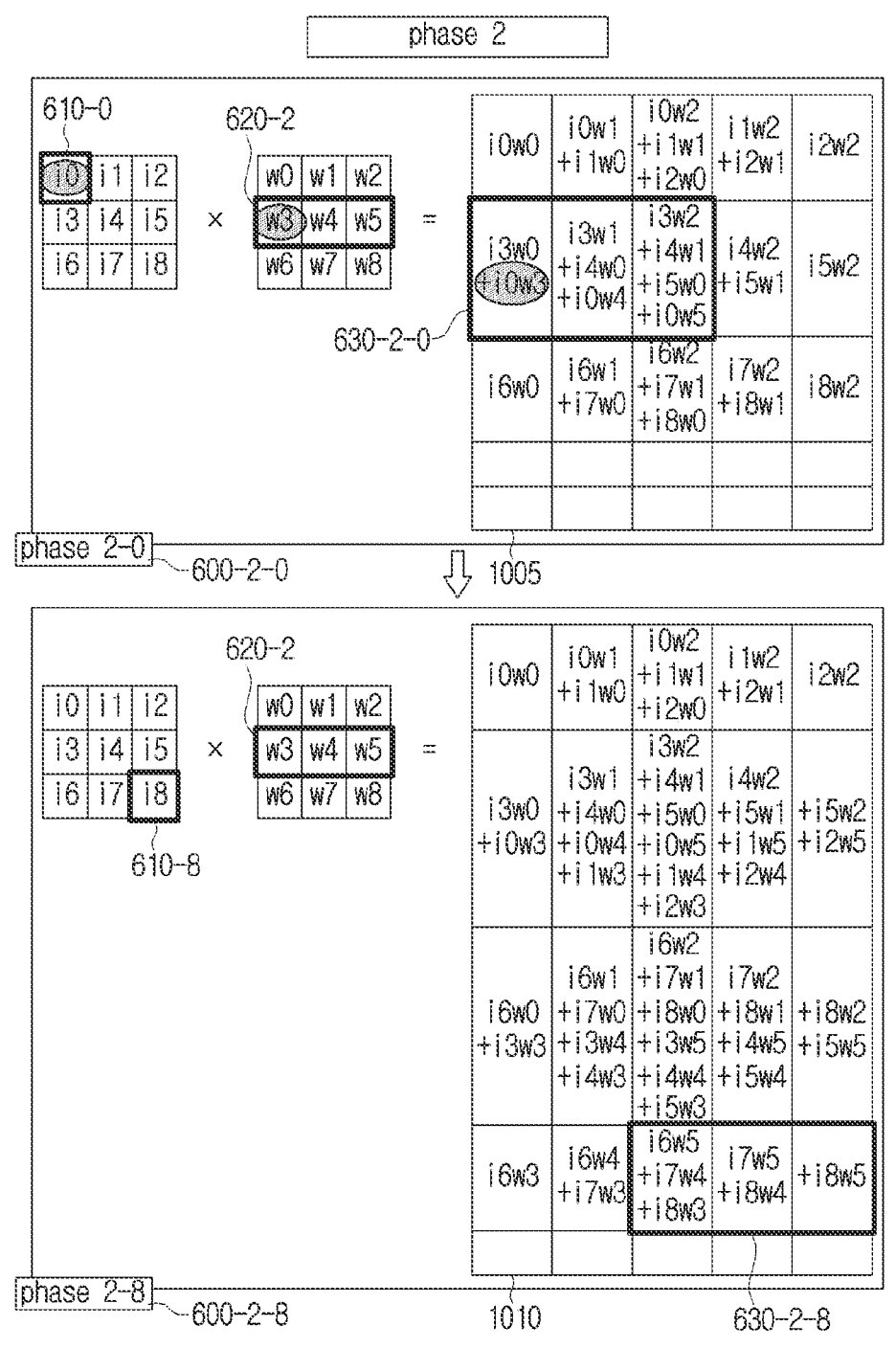

FIG. 10 illustrates a partial operation of the deconvolution calculation operation of FIG. 7.

Referring to FIG. 10, the second phase 600-2 may be classified into nine steps 600-2-0 to 600-2-8 based on the input data 610.

In the first step 600-2-0 (phase 2-0) of the second phase 600-2, the electronic apparatus 100 may perform a convolution calculation between the i0 610-0 and the second group 620-2 of the filter data 620 to obtain a plurality of intermediate values 630-2-0 which may include three intermediate values i0w3, i0w4, and i0w5. The plurality of intermediate values 630-2-0 may be additionally accumulated in the final accumulation matrix 920 of the first phase 600-1. The plurality of intermediate values 630-2-0 may be accumulated by moving in a downward direction (column direction) with respect to a position in which the plurality of intermediate values 630-1-0 are stored in the matrix 905. The result of accumulating the plurality of intermediate values 630-2-0 may be a matrix 1005.

The first (600-2-1) to seventh (600-1-7) steps repeat the first step and a redundant description will be omitted.

In the eighth step 600-2-8 (phase 2-8) of the second phase 600-2, the electronic apparatus 100 may perform a convolution calculation between i8 610-8 and the second group 620-2 of the filter data 620 to obtain a plurality of intermediate values 630-2-8. The plurality of intermediate values 630-2-8 may include three intermediate values $i8w3$, $i8w4$, and $i8w5$. The electronic apparatus 100 may accumulate and store the plurality of intermediate values 630-2-8 by moving in a right direction by stride 1 from the matrix in which the plurality of intermediate values $i7w3$, $i7w4$ and $i7w5$ are stored. The result of accumulating the plurality of intermediate values 630-2-8 may be the matrix 1010.

Figure 11A:
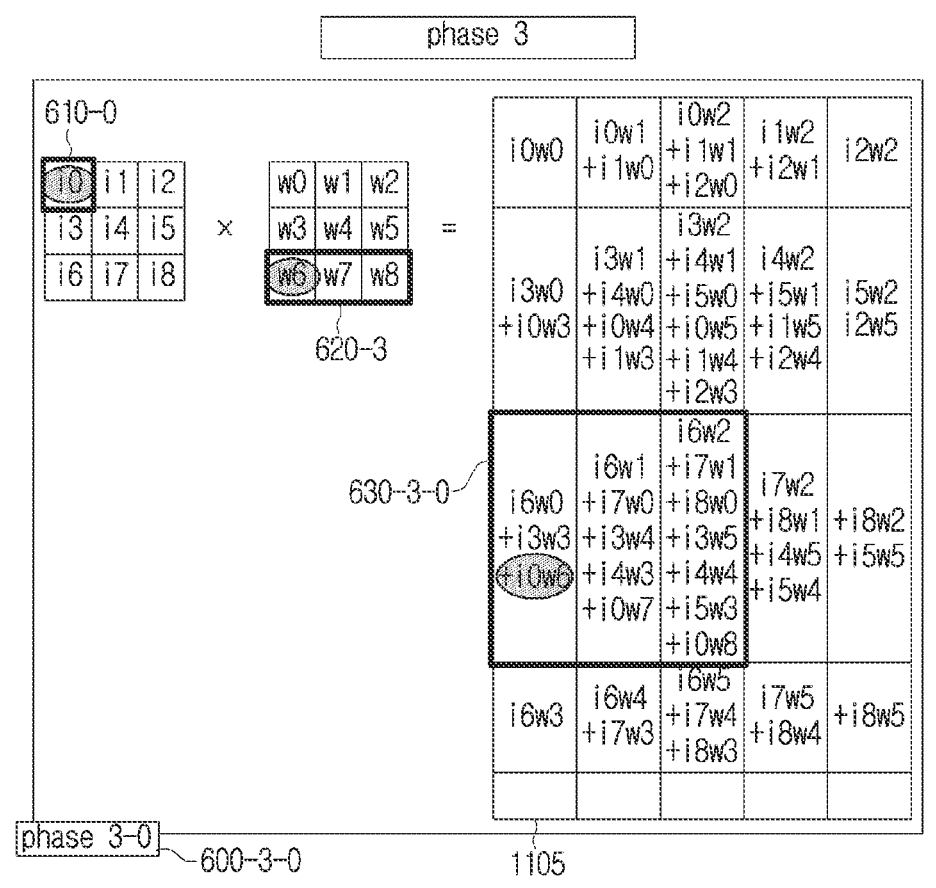
Figure 11B:
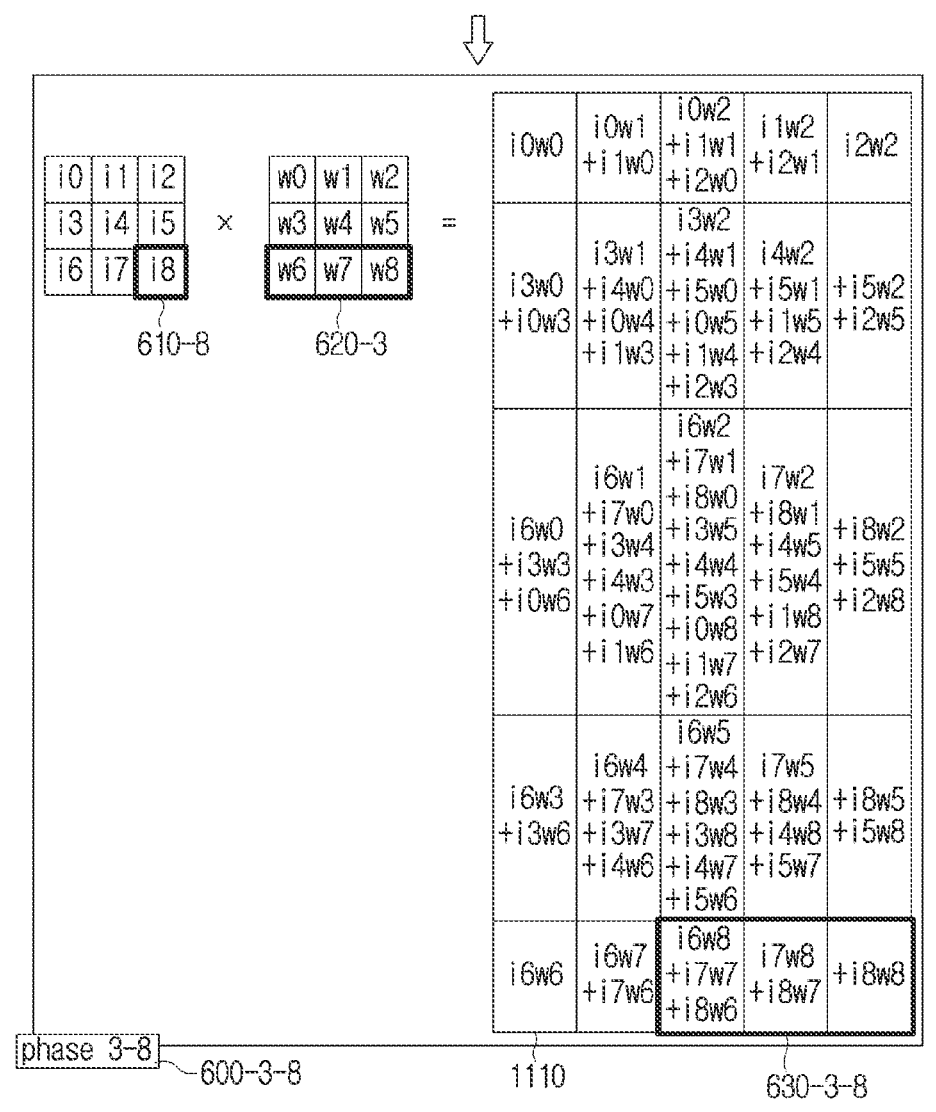

FIGS. 11A and 11B are diagrams illustrating a partial operation of the deconvolution calculation operation of FIG. 7.

Referring to FIGS. 11A and 11B, the third phase 600-3 of FIG. 8 may be classified into nine steps 600-3-0 to 600-3-8 based on the input data 610.

In the zeroth step 600-3-0 (phase 3-0) of the third phase 600-3, the electronic apparatus 100 may perform a convolution calculation between the i0 610-0 and the third group 620-3 of the filter data 620 to obtain a plurality of intermediate values 630-3-0. The plurality of intermediate values 630-3-0 may include three intermediate values $i0w6$, $i0w7$, and $i0w8$ and may be additionally accumulated in the final accumulation matrix 1010 of the second phase 600-2. The plurality of intermediate values 630-3-0 may be accumulated by moving in a downward direction (column direction) by stride 1 with respect to the position in which the plurality of intermediate values 630-2-0 are stored in the matrix 1005. The result of accumulating the plurality of intermediate values 630-3-0 may be the matrix 1105.

The first to seventh steps are repetitive with the zeroth step and a description thereof will be omitted.

In the eighth step 600-3-8 (phase 3-8) of the third phase 600-3, the electronic apparatus 100 may perform a convolution calculation between i8 610-8 and the third group 620-3 of the filter data 620 to obtain a plurality of intermediate values 630-3-8 including three intermediate values $i8w6$, $i8w7$, and $i8w8$. The electronic apparatus 100 may accumulate and store a plurality of intermediate values 630-3-8 by moving in the right direction by stride of 1 in a matrix in which a plurality of intermediate values $i7w6$, $i7w7$, $i7w8$ are stored. The result of accumulating the plurality of intermediate values 630-3-8 may be a matrix 1110.

If all phases for the filter data 620 divided into a total of three groups are completed, the electronic apparatus 100 can obtain the output data 630 which is a result value of the deconvolution calculation. The output data 630 may include information about the matrix 1110.

As described in FIGS. 9, 10, 11A and 11B, only the convolution calculation and the accumulation calculation are used in obtaining the result value of the deconvolution calculation. Therefore, the electronic apparatus 100 can obtain a result value of the deconvolution calculation using only the convolution calculation module.

Although the size of the filter data described in FIGS. 9, 10, 11A and 11B is described as 1*3, the minimum unit calculation process can be performed in units of 1*1 filter data. That is, the electronic apparatus 100 can obtain an intermediate value of 1*1 size by using a 1*1 size filter (or kernel) in performing one convolution calculation, and can store an obtained intermediate value of 1*1 size in a memory address corresponding to each intermediate value. The memory address corresponding to each intermediate value may vary according to the order of the convolution calculation.

Figure 12:
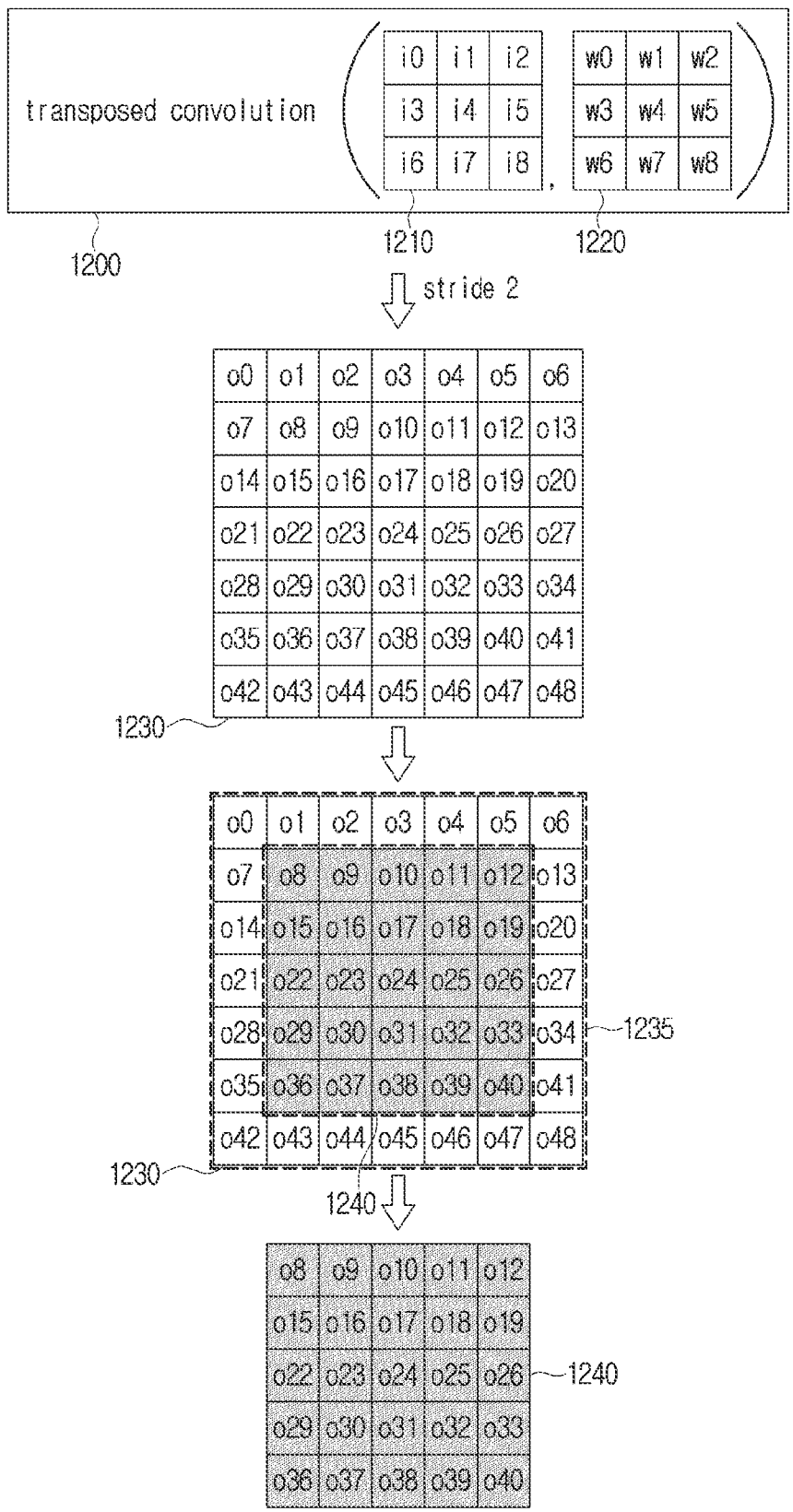
FIG. 12 illustrates performing a deconvolution calculation operation based on a size of a stride according to an embodiment.

FIG. 12 illustrates performing a deconvolution calculation operation based on a size of a stride according to an embodiment.

Referring to FIG. 12, in performing the deconvolution calculation 1200, the size of the input data 1210 is 3*3, the size of the filter data 1220 is 3*3, and the stride is 2.

The electronic apparatus 100 may obtain the output data 1230 in 7*7 size based on the input data 1210, the filter data 1220, and the stride 2. The electronic apparatus 100 may remove edge data 1235 from the obtained output data 1230 to obtain only partial data 1240 as a final result value. In order to convert input data having a size of 3×3 into output data having a size of 6×6, the electronic apparatus 100 can remove the edge data 1235 from the output data 1230. The edge data 1235 may refer to the outermost data in the matrix corresponding to the output data 1230, including o0, o1, o2, o3, o4, o5, o6, o13, o20, o27, o34, o41, o48, o47, o46, o45, o44, o43, o42, o35, o28, o21, o14, and o7.

If the stride is greater than or equal to 2, the electronic apparatus 100 may remove a portion corresponding to the edge data of the result values of the deconvolution calculation. In addition, the electronic apparatus 100 may obtain the remaining data from which a portion corresponding to the edge data is removed as a final result value of the result values of the deconvolution calculation. The reason that the electronic apparatus 100 removes the edge data when the stride is greater than or equal to 2, is that if the stride is 1, there is minimal need to perform the removal operation. If the stride is 1, when the removal operation is performed, the size of the input data and the size of the output data may be the same. Therefore, since the upscaling of the deconvolution calculation can be eliminated, the electronic apparatus 100 can remove the edge data only when the stride is greater than or equal to 2.

Figure 13:
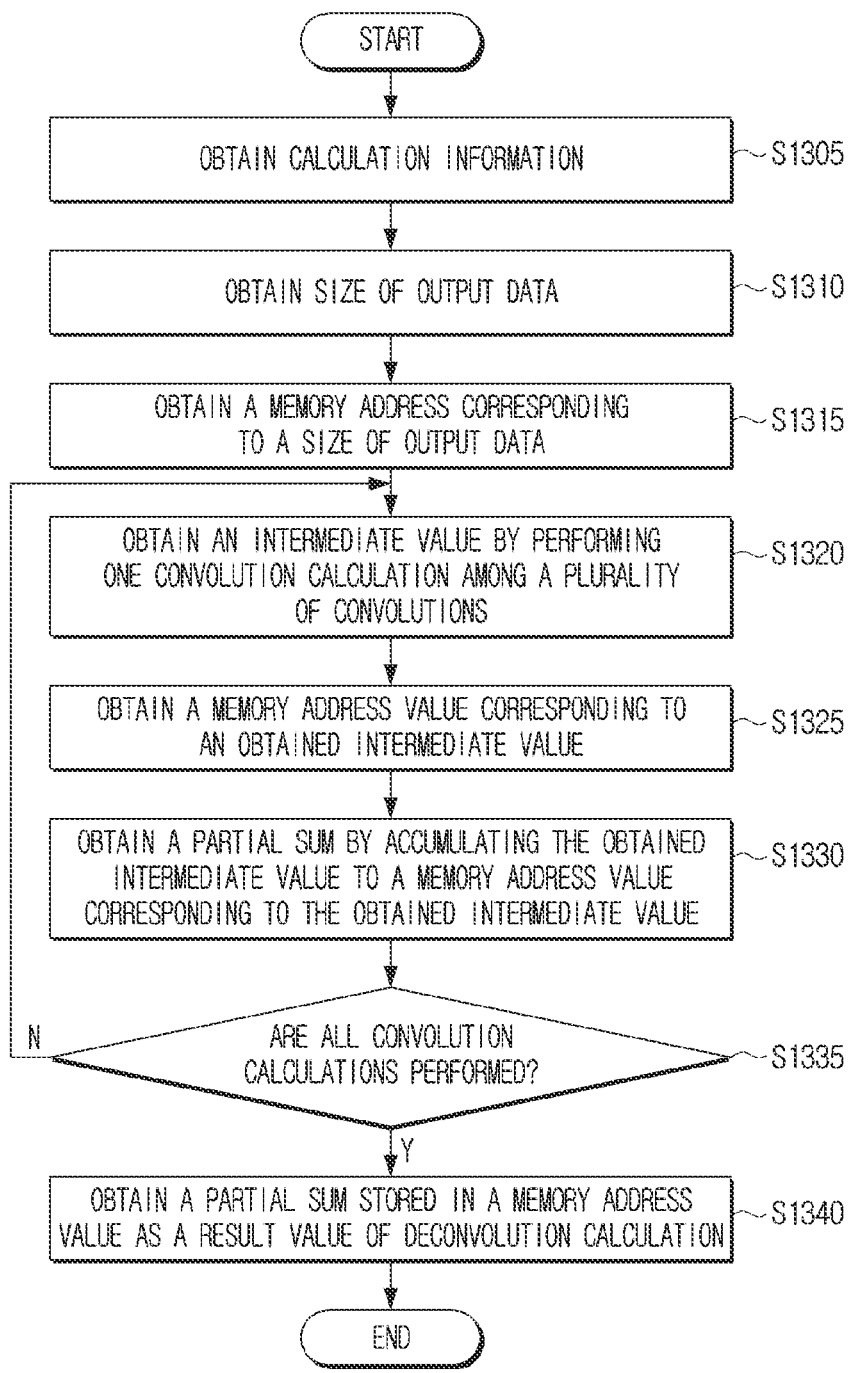
FIG. 13 illustrates a method for controlling an electronic apparatus according to a first embodiment.

FIG. 13 illustrates a method for controlling an electronic apparatus according to a first embodiment.

Referring to FIG. 13, the electronic apparatus 100 may obtain calculation information in step S1305. The calculation information may refer to various information required for the calculation. For example, the calculation information may be at least one of a type of calculation (whether a convolution calculation or a deconvolution calculation), input data, filter data (or kernel data), or a stride.

The electronic apparatus 100 may obtain the size of the output data based on the received operation information in step S1310. The output data may be of different sizes based on the operation information. The electronic apparatus 100 may obtain a memory address corresponding to the size of the output data based on the obtained size of the output data in step S1315. Specifically, the electronic apparatus 100 may specify a space of the memory to which the output data is to be stored. For example, if the output data is a 5*5 size matrix, the electronic apparatus 100 may specify a memory space to store a matrix of 5*5 size. The memory space may be specified as a memory address value. That is, the electronic apparatus 100 can obtain a memory address value in which a 5*5 size matrix is to be stored. The electronic apparatus 100 can exchange information with the memory 110 to obtain a memory address value. A detailed description will be provided below with reference to FIG. 15.

The electronic apparatus 100 may perform a convolution calculation among one of a plurality of convolution calculations after obtaining a memory address. The plurality of convolution calculations may be performed by the electronic apparatus 100 sequentially by a predetermined order. The electronic apparatus 100 may perform one convolution calculation to obtain an intermediate value that is a result of one convolution calculation in step S1320. One convolution calculation may be a calculation of a 1*1 kernel unit (or a 1*1 channel). An intermediate value, which is a calculation result value of 1*1 kernel unit, can be obtained by performing a 1*1 kernel unit calculation.

In step S1325, the electronic apparatus 100 may obtain a memory address value corresponding to the obtained intermediate value. Since each of the plurality of convolution calculation has a predetermined order, the electronic apparatus 100 can obtain a memory address value corresponding to an intermediate value that is a result of the convolution calculation based on a predetermined order. The electronic apparatus 100 may obtain the result of the convolution calculation only after performing a calculation operation, but may obtain information about at which memory address value the result of the convolution calculation is to be stored, prior to performing the calculation operation.

The electronic apparatus 100 may accumulate an obtained intermediate value in a memory address value corresponding to the obtained intermediate value to obtain a partial sum in step S1330. The intermediate value may indicate one calculation result, and the partial sum may indicate the result of the sum of multiple intermediate values. That is, a plurality of intermediate values can be accumulated and stored in the same memory address value. The value of accumulating an intermediate value in a repetitive manner is described as a partial sum, but even if the intermediate value is not additionally accumulated, the obtained intermediate value may be described as a partial sum.

A specific operation will be described with reference to FIGS. 16, 17, 18 and 19.

The electronic apparatus 100 can determine whether all of the plurality of convolution calculations have been performed after obtaining an intermediate value in step S1335. When the electronic apparatus 100 determines that there is a convolution calculation to be additionally performed without performing the convolution calculation, the next convolution calculation can be performed according to the predetermined order. If the electronic apparatus 100 determines that all of the plurality of convolution calculations have been performed in the operation of S1335, the electronic apparatus 100 may obtain the partial sum stored in the memory address value as a result of the deconvolution calculation in step S1340.

Figure 14:
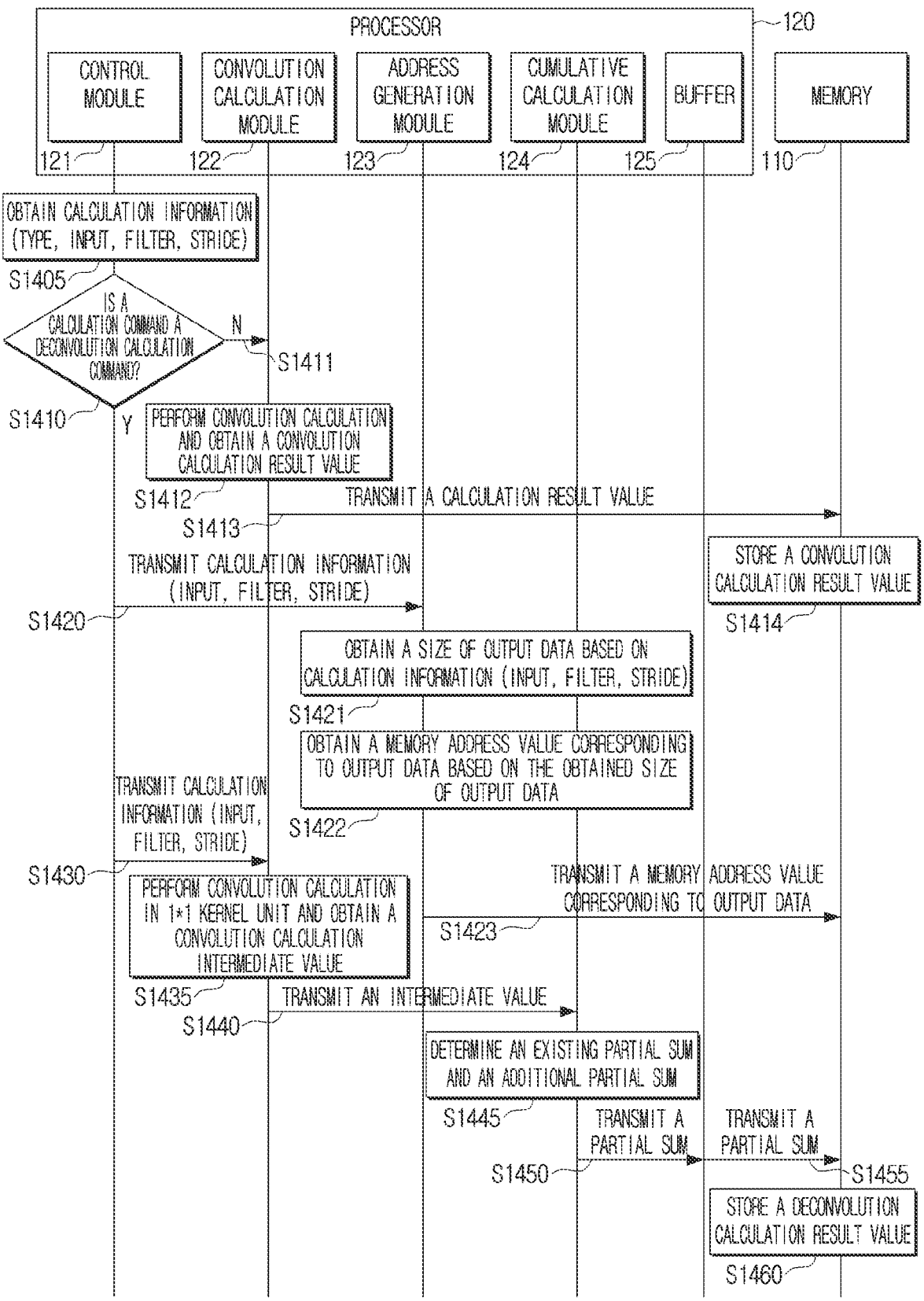
FIG. 14 illustrates a method for controlling an electronic apparatus according to a second embodiment.

FIG. 14 illustrates a method for controlling an electronic apparatus according to a second embodiment.

Referring to FIG. 14, the electronic apparatus 100 may include the memory 110 and the processor 120, wherein the processor 120 can include the control module 121, the convolution calculation module 122, the address generation module 123, the cumulative calculation module 124, and a buffer 125.

The control module 121 can obtain calculation information in step S1405. The calculation information can include at least one of a type of calculation, input data information, filter data information, and stride information. The input data information may include the size information of the input data as well as the input data information, and the filter data information may include the size information of the filter data. The stride information can also include the size information of the stride. The control module 121 can determine whether the calculation command is a deconvolution operation in step S1410, based on the type information of the calculation command included in the calculation information.

When the calculation command is a convolution calculation rather than a deconvolution calculation, the control module 121 can transmit the calculation information to the convolution calculation module 122 in step S1411. The convolution calculation module 122 may perform a convolution calculation based on the received information and obtain a result value for the convolution calculation in step S1412. The convolution calculation module 122 can transmit a result value for the obtained convolution calculation to the memory 110 in step S1413. The convolution calculation module 122 has been described as transmitting a calculation result value to the memory 110, but the convolution calculation module 122 can transmit the calculation result value to the memory 110 through the buffer 125 as an alternative. The memory 110 may receive and store a calculation result value in step S1414.

If the calculation command is a deconvolution calculation, the control module 121 can transmit the calculation information to the address generation module 123 in step S1420. The address generation module 123 can obtain the size of the output data based on the calculation information in step S1421. The address generation module 123 can obtain a memory address value corresponding to the output data based on the size of the obtained output data in step S422. A specific embodiment of obtaining a memory address value will be described in detail in FIG. 15. The address generation module 123 can transmit the obtained memory address value to the memory 110 in step S1423.

When the calculation command is the deconvolution calculation, the control module 121 may transmit the calculation information to the convolution calculation module 122 in step S1430. The convolution calculation module 122 may perform a convolution calculation of a 1×1 kernel unit based on the received calculation information to obtain an intermediate result value (or intermediate value) of the convolution calculation in step S1435. The convolution calculation of the 1*1 kernel unit may apply the filter data corresponding to the 1*1 channel. A calculation in the minimum unit in the separate convolution operation of the kernel (having similar function to a filter) can be performed using the filter data of 1*1 size. The intermediate value obtained during the calculation of the minimum unit can be set to 1*1, and an intermediate value of 1*1 can be stored in a memory address corresponding to an intermediate value of 1*1. A description of the process for storing the intermediate value to the memory address will be provided in steps S1440 to S1465.

The convolution calculation module 122 can transmit the obtained intermediate value to the cumulative calculation module in step S1440. In addition, the cumulative calculation module 124 may receive an intermediate value from the convolution calculation module 122, accumulate the received intermediate value to an existing partial sum, and determine whether there is an additional partial sum in step S1445. The existing partial sum may indicate an intermediate value that has already been obtained or an intermediate value obtained by the cumulative calculation module 124. An additional partial sum may indicate a new partial sum obtained by accumulating a new intermediate value to be accumulated by additionally performing a convolution calculation. The cumulative calculation module 124 can transmit the partial sum to the buffer 125 in step S450. The buffer 125 can store the partial sum received from the cumulative calculation module 124. The buffer 125 may transmit a partial sum to the memory 110 in step S1455. The memory 110 can store the partial sum as a result of the deconvolution calculation in the memory 110 in step S1460. A specific operation in relation to the accumulation operation will be described in FIG. 16.

Figure 15:
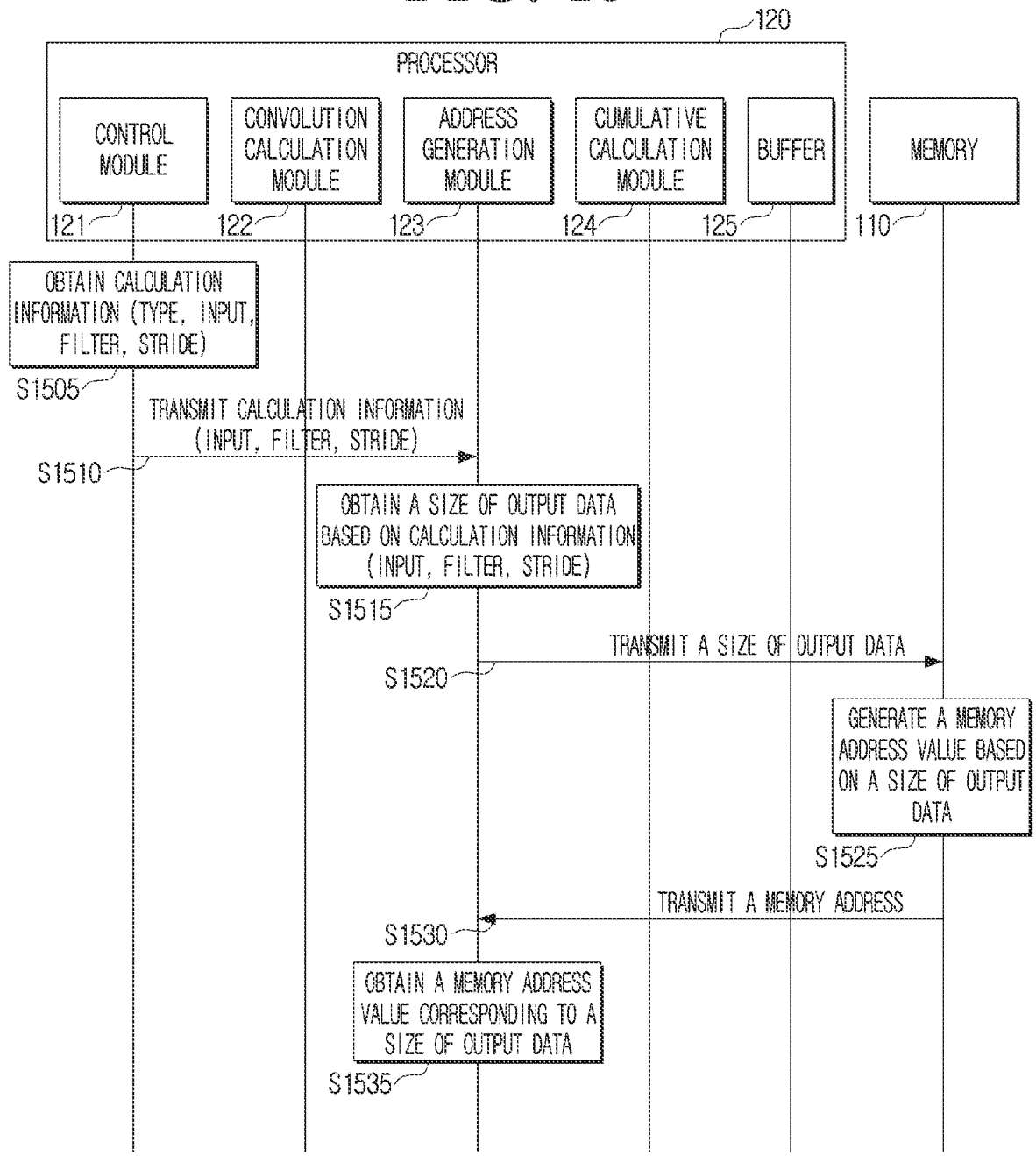
FIG. 15 illustrates a method for controlling an electronic apparatus according to a third embodiment.

FIG. 15 illustrates a method for controlling an electronic apparatus according to a third embodiment.

Referring to FIG. 15, the control module 121 can obtain calculation information in step S1505. The control module 121 can transmit the obtained calculation information to the address generation module 123 in step S1510. The address generation module 123 may obtain the size information of the output data based on the received calculation information in step S1515. The address generation module 123 can transmit the size information of the obtained output data to the memory 110 in step S1520. Specifically, the step S1520 may refer to designating a memory region in which the output data is to be stored and transmitting, to the memory 110, a request to return the memory address value corresponding to the designated region. The memory 110 may designate a memory region in which the output data is to be stored based on the received output data size information, and generate a memory address value corresponding to the designated memory region in step S1525. The memory 110 can transmit the generated memory address value to the address generation module 123 in step S1530. The address generation module 123 may obtain a memory address value corresponding to the obtained size of output data in step S1535.

Figure 16:
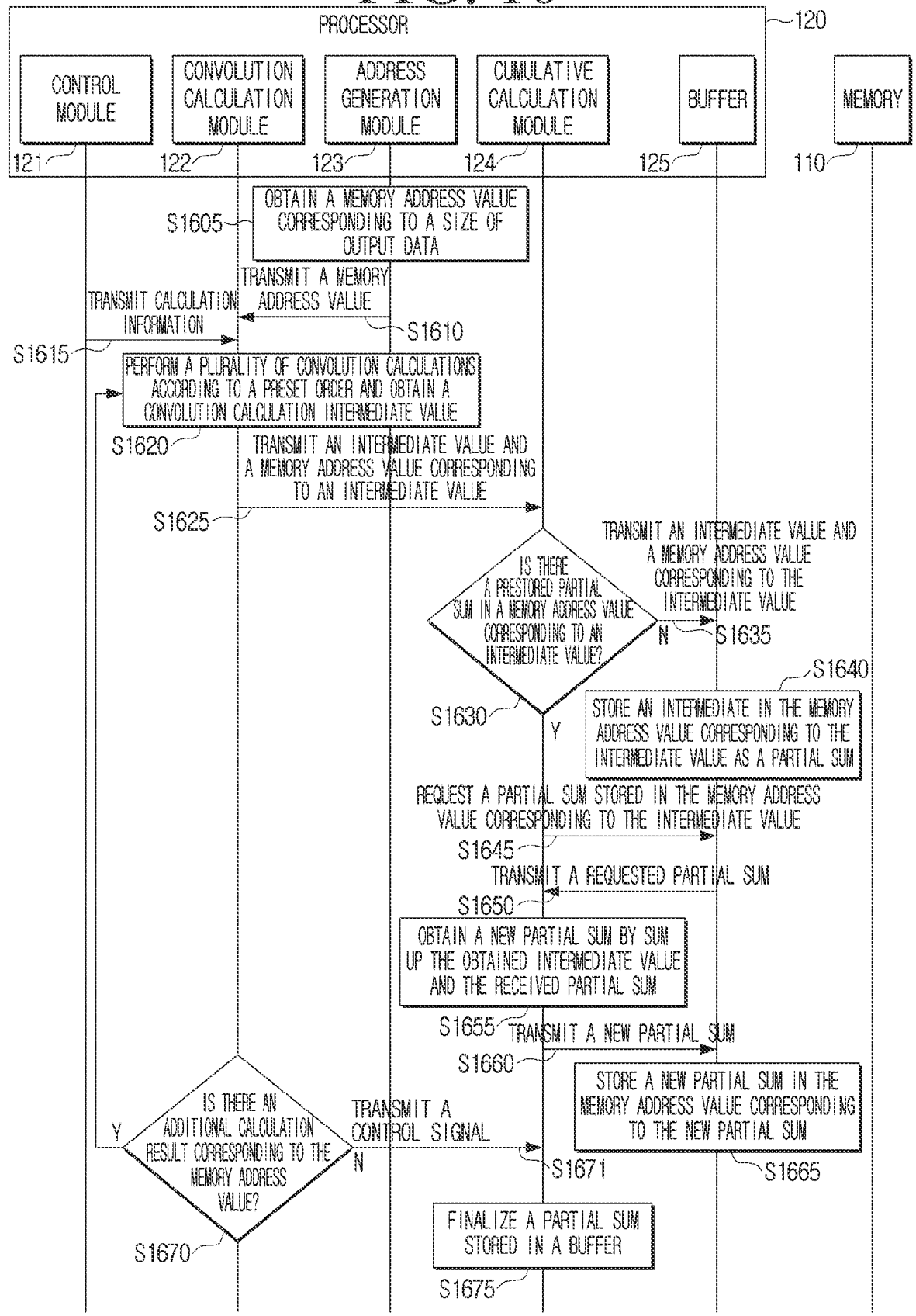
FIG. 16 illustrates a method for controlling an electronic apparatus according to a fourth embodiment.

FIG. 16 illustrates a method for controlling an electronic apparatus according to a fourth embodiment.

Referring to FIG. 16, it is assumed that steps S1505 to S1535 performed in FIG. 15 are performed. The address generation module 123 can obtain a memory address value corresponding to the obtained size of the output data in step S1605. The step S1605 may correspond to S1535 of FIG. 15.

After step S1605 is performed, the address generation module 123 can transmit the obtained memory address value to the convolution calculation module 122 in step S1610. The control module 121 can transmit the calculation information to the convolution calculation module 122 in step S1615. The convolution calculation module 122 may determine the number of times the convolution operation is performed based on the received calculation information. The convolution calculation module 122 may perform a plurality of convolution calculations according to the preset order information in step S1620. The intermediate result value obtained in one convolution calculation is referred to as an intermediate value. The convolution calculation module 122 may perform a convolution calculation of one of a plurality of convolution calculations to obtain one intermediate value. The convolution calculation module 122 may obtain an intermediate value and a memory address value corresponding to the intermediate value based on the received memory address value and the preset order information. The address generation module 123 can transmit the obtained intermediate value and a memory address value corresponding to the obtained intermediate value to the cumulative calculation module 124 in step S1625.

The cumulative calculation module 124 may determine whether there is a partial sum stored in a memory address value corresponding to the intermediate value in step S1630. Since one or more intermediate values can be stored in the same memory address value, the cumulative calculation module 124 can update the partial sum. Accordingly, the cumulative calculation module 124 can determine whether an existing partial sum is stored in the corresponding memory address value when the obtained intermediate value is stored in a memory address value corresponding to the intermediate value. The value performed and obtained by the convolution calculation module 122 may be referred to as an intermediate value, and the values stored in the buffer 125 or the memory 110 may be referred to as a partial sum. Depending on cases, the intermediate value which is initially stored in the memory address value, without performing accumulation calculation, may be referred to as a partial sum.

If there is no prestored partial sum in the memory address value corresponding to the intermediate value, the cumulative calculation module 124 can transmit a memory address value corresponding to the obtained intermediate value and the obtained intermediate value to the buffer 125 in step S1635. The buffer 125 may store a memory address value corresponding to the obtained intermediate value and the obtained intermediate value in step S1640.

If there is a prestored partial sum in a memory address value corresponding to an intermediate value, the cumulative calculation module 124 can request a memory address value corresponding to the obtained intermediate value to the buffer 125 in step S1645. The buffer 125 may transmit the partial sum prestored in the obtained memory address value to the cumulative calculation module 124 in step S1650. The cumulative calculation module 124 may sum up the obtained intermediate value and the received partial sum to obtain a new partial sum in step S1655. The cumulative calculation module 124 can transmit a new partial sum to the buffer 125 in step S1660. The buffer 125 may store a new partial sum in a memory address value corresponding to the new partial sum in step S1665. The memory address value corresponding to the existing partial sum and the memory address value corresponding to the new partial sum can be identical.

After performing steps S1620 and S1665, the convolution calculation module 122 may identify a memory address value corresponding to the intermediate value obtained in step S1620, and determine whether there is an additional convolution calculation result to be stored in the identified memory address value in step S1670. As described above, a plurality of intermediate values can be stored in one memory address value so that a partial sum can be updated. The convolution calculation module 122 can determine whether there is an intermediate value to be additionally accumulated in the memory address value.

If it is determined that there is an intermediate value that is to be additionally accumulated in the address value, the convolution calculation module 122 may perform a next convolution calculation based on the preset order to obtain the intermediate value.

If it is determined that there is no intermediate value to be additionally accumulated to the address value, the convolution calculation module 122 can transmit a control signal to finalize the partial sum stored in the buffer to the cumulative calculation module 124 in step S1671. The cumulative calculation module 124 may finalize the partial sum stored in the buffer 125 in step S1675.

The cumulative calculation module 124 can request the buffer 125 to transmit a memory address value corresponding to the determined partial sum and the determined partial sum to the memory 110. The buffer 125 can transmit a memory address value corresponding to the calculated partial sum and the determined partial sum to the memory 110. The memory 110 can store the finalized partial sum in a memory address value corresponding to an accumulated partial sum.

Figure 17:
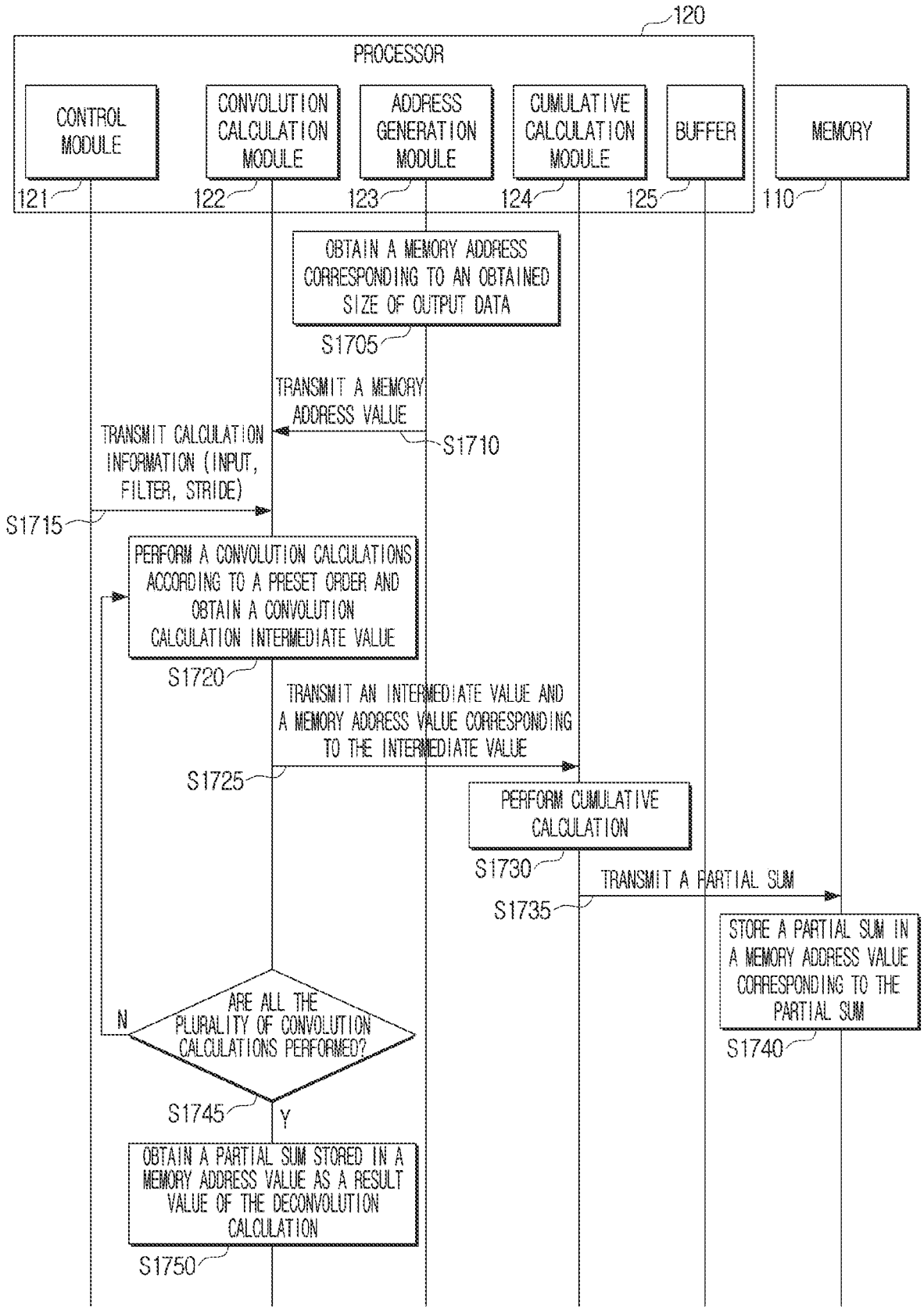
FIG. 17 illustrates a method for controlling an electronic apparatus according to a fifth embodiment.

FIG. 17 illustrates a method for controlling an electronic apparatus according to a fifth embodiment.

Referring to FIG. 17, it is assumed that steps S1505 to S1535 performed in FIG. 15 and steps S1605 to S1690 of FIG. 16 are performed. The address generation module 123 can obtain a memory address value corresponding to the size of the obtained output data in step S1705, which may correspond to the step S1535 of FIG. 15.

The address generation module 123 can transmit the obtained memory address value to the convolution calculation module 122 in step S1710. The control module 121 can transmit the calculation information to the convolution calculation module 122 in step S1715.

The convolution calculation module 122 may determine the number of times the convolution calculation is performed based on the received calculation information. The convolution calculation module 122 may perform a plurality of convolution calculations according to the preset order information in step S1720, which can correspond to step S1620 of FIG. 16, and thus a duplicate description will be omitted. The convolution calculation module 122 can transmit a memory address value corresponding to the intermediate value and the intermediate value to the cumulative calculation module 124 in step S1725. The cumulative calculation module 124 may perform a cumulative calculation operation in step S730. The cumulative calculation module 124 can transmit the partial sum obtained in the accumulation calculation operation in the memory 110 in step S1735. The memory 110 can store the partial sum in a memory address value corresponding to the partial sum in step S1740. Steps S1730, S1735, and S1740 described in FIG. 17 can correspond to steps S1630 to S1690 of FIG. 16. Therefore, a detailed description thereof will be omitted in FIG. 17.

After step S1720 is performed, the convolution calculation module 122 can determine whether all of the plurality of convolution calculations have been performed in step S1745. If all of the plurality of convolution calculations is not performed, the convolution calculation module 122 can perform a next convolution calculation based on the preset order. If it is determined that the plurality of convolution calculations are all performed, the convolution calculation module 122 can obtain the partial sum stored in the memory address value as the final result value of the deconvolution calculation in step S1750.

Figure 18:
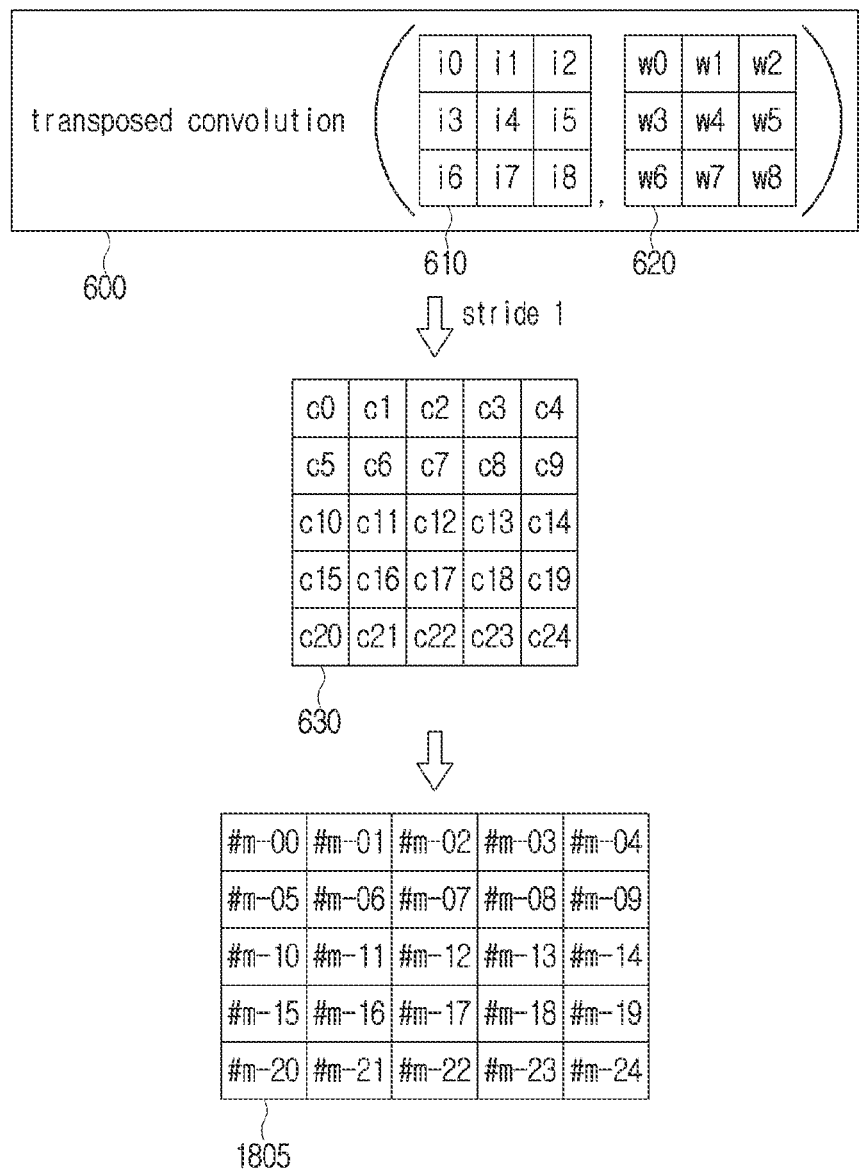
FIG. 18 illustrates an operation of allocating a result value of a deconvolution calculation operation to a memory address.

FIG. 18 illustrates an operation of allocating a result value of a deconvolution calculation operation to a memory address.

Referring to FIG. 18, the electronic apparatus 100 may perform the deconvolution calculation 600 based on input data 610, filter data 620, and stride 1. The above-described calculation operation is the same as that described in FIG. 7, and thus a duplicate description thereof will be omitted.

The electronic apparatus 100 may obtain the output data of 5*5 based on the input data 610 of 3*3 size, the filter data 620 of 3*3 size, and stride 1. The input data 610 of 3*3 size, the filter data 620 of 3*3 size, and the stride 1 can be included in the calculation information. The electronic apparatus 100 may obtain information that the size of output data is 5*5 based on the calculation information. The size of the output data may vary according to the size of the input data, the size of the filter data, and the stride, included in the calculation information, and the information may have been already stored in the electronic apparatus 100.

When the size of the output data is 5*5, the electronic apparatus 100 can obtain a memory address value corresponding to the size of the output data. The output data 630 can be in the form of a matrix of 5*5*from C0 to C24. The values of C0 to C24 included in the output data 630 can be stored in a memory address value corresponding to its own value. A memory address value corresponding to the output data 630 can be calculated directly by the electronic apparatus 100 or obtained by the memory 110 and may correspond to a matrix 1805.

The memory address value corresponding to the output data 630 may include a total of 25 address values from #m-00 to #m-24. For example, C0 included in the output data may be stored in #m-00, and C24 may be stored in #m-24.

Figure 19:
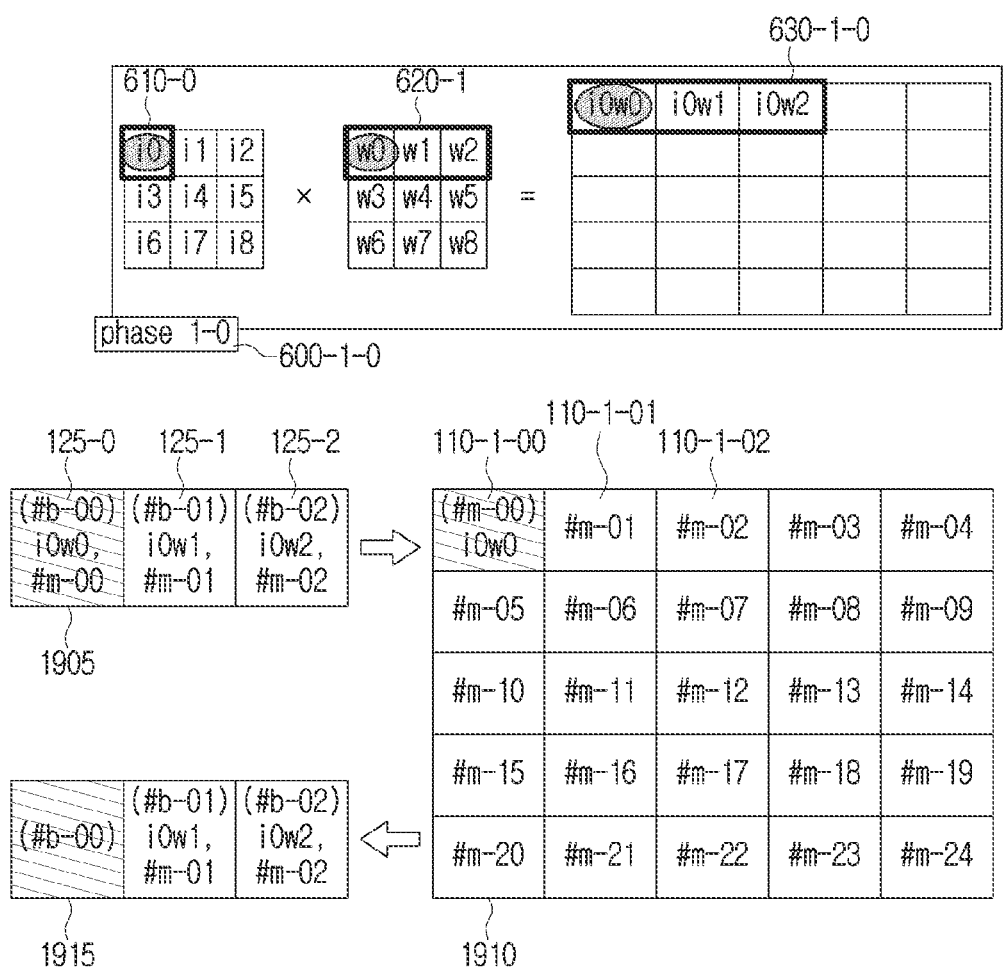
FIG. 19 illustrates an operation of allocating an intermediate value obtained from a deconvolution calculation operation to a buffer address and a memory address according to a first embodiment.

FIG. 19 illustrates an operation of allocating an intermediate value obtained from a deconvolution calculation operation to a buffer address and a memory address according to a first embodiment.

Referring to FIG. 19, the operation of the zeroth stage 600-1-0 in the first phase 600-1 of the processes in FIG. 9 will be described using the address value of the buffer 125 and the address value of the memory 110. A detailed operation has already been described in FIG. 9, and thus a redundant description will be omitted.

Referring to FIG. 19, it is assumed that the address value of the buffer is 3 and the address value of the buffer is #b-00 (125-0), #b-01 (125-1), #b-02 (125-2). The first address value 125-0 of the buffer, the second address value 125-1 of the buffer, and the third address value 125-2 of the buffer are described below.

The electronic apparatus 100 can obtain $i0w0$, $i0w1$, $i0w2$, which are a plurality of intermediate values 630-1-0 in the zeroth stage 600-1-0 of the first phase 600-1. As described in FIG. 18, each intermediate value can obtain a memory address value corresponding to an intermediate value. Value $i0w0$ may correspond to a first address value of a memory (#m-00, 110-1-00), $i0w1$ may correspond to a second address value (#m-01, 110-1-01) of a memory, and $i0w2$ may correspond to a third address value (#m-02, 110-1-02) of the memory.

In one embodiment, $i0w0$, $i0w1$, and $i0w2$, which are a plurality of intermediate values, can be implemented in the form of being stored in the memory 110. However, in FIG. 19, other embodiments of storing in the memory 110 through the buffer 125 will be described.

The electronic apparatus 100 can store the obtained intermediate values $i0w0$, $i0w1$, $i0w2$ in the buffer 125 in order based on the obtained order. For example, the electronic apparatus 100 may store $i0w0$ in the first address value 125-0 of the buffer, store $i0w1$ in the second address value 125-1 of the buffer, and store $i0w2$ in the third address value 125-2 of the buffer. Alternatively, the electronic apparatus 100 may store an intermediate value in the address value of each buffer along with an address value of a memory corresponding to the intermediate value. For example, the intermediate value $i0w0$ and the address value #m-00 corresponding to the intermediate value $i0w0$ may be stored in the first address value 125-0 of the buffer, the intermediate value $i0w1$ and the address value #m-01 of the memory corresponding to the $i0w1$ may be stored in the second address value 125-1 of the buffer, and the intermediate value $i0w2$ and the address value #m-02 of the memory corresponding to the intermediate value $i0w2$ can be stored in the third address value 125-2 of the buffer.

After the zeroth stage 600-1-0 of the first phase 600-1 is completed, a format of storing in the buffer 125 may be as in Table 1905.

The electronic apparatus 100 can determine whether there is an intermediate value to be additionally accumulated based on a memory address value corresponding to each intermediate value, which may correspond to step S1670 of FIG. 16. The electronic apparatus 100 can identify a memory address value (#m-00) corresponding to the obtained intermediate value (i0w0), and may determine whether there is an intermediate value to be additionally accumulated in a memory address value (#m-00) corresponding to the obtained intermediate value (i0w0). The electronic apparatus 100 can determine whether there is an additional intermediate value based on the size of the output data and the order of execution of the convolution calculation.

Referring to a matrix 1110 corresponding to the output data of FIG. 11, an intermediate value corresponding to the memory address value (#m-00) can be only i0w0. Therefore, the electronic apparatus 100 can determine that there is no intermediate value to be accumulated to the memory address value (#m-00) corresponding to the obtained intermediate value (i0w0). If there is no intermediate value to be additionally accumulated in the memory address value (#m-00) corresponding to the obtained intermediate value (i0w0), the electronic apparatus 100 can transmit an intermediate value (i0w0)(or partial sum) stored in the first address value 125-0 of the buffer to the memory 110. The memory 110 may store the received intermediate value i0w0 in a memory address value #m-00 corresponding to an intermediate value i0w0.

Referring to the matrix 1110 corresponding to the output data of FIG. 11, the intermediate value i0w1 corresponding to the memory address value #m-01 may have an intermediate value i1w0 to be additionally stored. Therefore, the electronic apparatus 100 can determine that there is an intermediate value to be added to the memory address value #m-01 corresponding to the obtained intermediate value i0w1. When there is an intermediate value to be further accumulated in the memory address value #m-01 corresponding to the obtained intermediate value i0w1, the electronic apparatus 100 can continuously store the intermediate value i0w1 stored in the second address value 125-1 of the buffer in the second address value 125-1 of the buffer without transmitting the intermediate value i0w1 stored in the second address value 125-1 of the buffer to the memory.

The electronic apparatus 100 can continuously store the intermediate value i0w2 stored in the third address value 125-2 of the buffer to the third address value 125-2 of the buffer without directly transmitting to the memory 110. A detailed description of the intermediate value i0w2 is the same as the intermediate value i0w1, and thus a duplicate description will be omitted.

Referring to Table 1910, the electronic apparatus 100 may transmit only the intermediate value i0w to the memory 110 after the zeroth stage 600-1-0 of the first phase 600-1 and store the intermediate value i0w0 in the address value #m-00 of the memory corresponding to the intermediate value i0w0.

The electronic apparatus 100 can delete the intermediate value i0w0 stored in the first address value 125-0 of the buffer and the address value #m-00 of a memory corresponding to the intermediate value i0w0 from the first address value 125-0 of the buffer after transmitting the intermediate value i0w0 to the memory 110 (or after receiving the control signal that the memory 110 has stored the intermediate value i0w0), since the intermediate value i0w0 is not additionally accumulated, it is unnecessary for this value to be stored in the buffer 125. After the intermediate value i0w0 and the address value #m-00 of a memory corresponding to the intermediate value i0w0 are deleted, the method can correspond to Table 1915.

Figure 20:
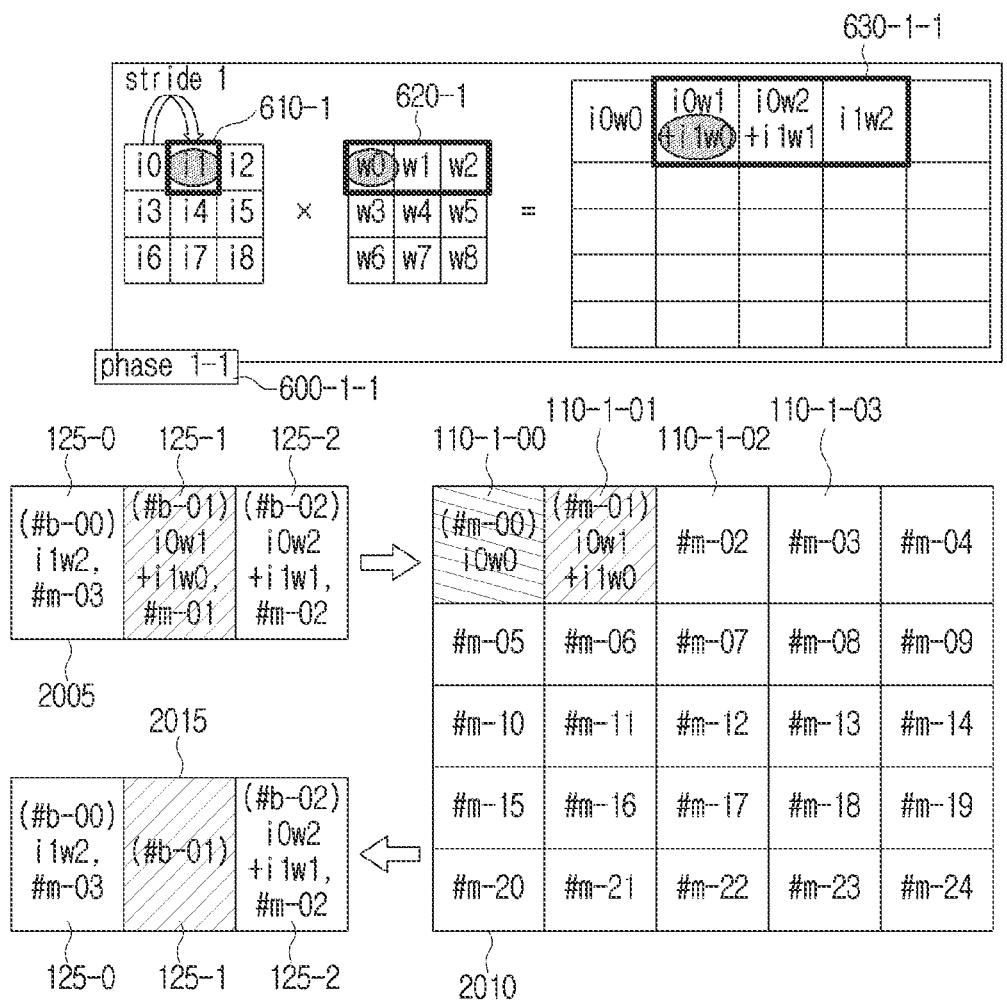
FIG. 20 illustrates an operation of allocating an intermediate value obtained from a deconvolution calculation operation to a buffer address and a memory address according to a second embodiment.

FIG. 20 illustrates an operation of allocating an intermediate value obtained from a deconvolution calculation operation to a buffer address and a memory address according to a second embodiment.

Referring to FIG. 20, the operation of the first stage 600-1-1 (phase 1-1) of the first phase 600-1 will be described using the address value of the buffer 115 and the address value of the memory 110 during the process described in FIG. 9. The detailed operation has already been described in FIG. 9, and thus a redundant description will be omitted. In addition, the operation described in FIG. 20 is continuous with the operation described in FIG. 19, and thus duplicate descriptions are omitted.

The electronic apparatus 100 can obtain i1w0, i1w1, i1w2, which are a plurality of intermediate values 630-1-1—in the first stage 600-1-1 of the first phase 600-1. As described in FIG. 18, each intermediate value can obtain a memory address value corresponding to an intermediate value. Value i1w0 may correspond to a second address value of a memory (#m-01, 110-1-01), i1w1 may correspond to a third address value (#m-02, 110-1-02) of a memory, and i1w2 can correspond to a fourth address value #m-03, 110-1-03 of a memory.

The electronic apparatus 100 can store the obtained intermediate values i1w0, i1w1, i1w2 in the buffer 125 and can determine at which address of the buffer 125 the obtained intermediate values i1w0, i1w1, i1w2 will be stored. Specifically, the electronic apparatus 100 can determine whether information on a memory address value corresponding to the obtained intermediate value is already stored in the buffer 125. Referring to FIG. 19, since the intermediate value is not stored in the buffer 125, no determination of whether the information on the memory address value corresponding to the intermediate value is already stored in the buffer 125 is made. However, if an intermediate value is already accumulated in the buffer 125, the electronic apparatus 100 can determine whether a memory address value corresponding to the newly obtained intermediate value is stored in the buffer. When the memory address value corresponding to the newly obtained intermediate value is stored in the buffer, the electronic apparatus 100 can accumulate a new intermediate value in the buffer in which the corresponding memory address value is stored.

The electronic apparatus 100 can obtain an intermediate value i1w0 and a memory address value #m-01 corresponding to the intermediate value i1w0 and can determine whether the information for the memory address value #m-01 is stored in the buffer 125. If there is information about the memory address value #m-01 in the buffer 125, the electronic apparatus 100 can identify the address values #b-01, 125-1 of the buffer in which the memory address value #m-01 is stored, and may sum up the existing partial sum i0w1 and the new intermediate value i1w0 to the identified address values #b-01, 125-1. The electronic apparatus 100 can store the summed new partial sum i0w1+i1w0 in the identified address values of the buffer #b-01, 125-1.

Similarly, the electronic apparatus 100 can obtain the intermediate value i1W1 and a memory address value #m-02 corresponding to the intermediate value i1W1. The electronic apparatus 100 can store the summed new partial sum i0w2+i1w1 in the identified address values of the buffer #b-02, 125-2. A redundant description will be omitted.

The electronic apparatus 100 can obtain an intermediate value i1w2 and a memory address value #m-03 corresponding to the intermediate value i1w2. Since the memory address value #m-03 corresponding to the intermediate value i1w2 is not stored in the buffer, the electronic apparatus 100 may store the intermediate value i1$w$2 and a memory address value #m-03 corresponding to the intermediate value i1$w$2 in an address value of a new buffer or an address value of the empty buffer #b-00, 125-0.

A final form in which the intermediate values i1$w$0, i1$w$1, i1$w$2 are stored in the buffer 125 is shown in Table 2005.

As illustrated in FIG. 19, the electronic apparatus 100 can determine whether there is an additional partial sum based on a memory address value corresponding to the intermediate value stored in the buffer, which may correspond to step S1670 of FIG. 16.

Referring to the matrix 1110 corresponding to the output data described in FIG. 11, a partial sum (i0$w$1+i1$w$0) corresponding to the memory address value (#m-01) does not have an intermediate value to be additionally accumulated. Therefore, the electronic apparatus 100 can determine that there is no intermediate value to be additionally accumulated in the memory address value #m-01 corresponding to the obtained partial sum i0$w$1+i1$w$0. In this case, the electronic apparatus 100 can transmit the partial sum i0$w$1+i1$w$0 stored in the second address value #b-01, 125-1 of the buffer to the memory 110. The memory 110 can store the received partial sum i0$w$1+i1$w$0 in a memory address value #m-01 corresponding to a partial sum i0$w$1+i1$w$0.

Referring to the matrix 1110 corresponding to the output data described in FIG. 11, a partial sum i0$w$2+i1$w$1 corresponding to the memory address value #m-02 may have an intermediate value i2$w$0 to be additionally stored. Therefore, the electronic apparatus 100 can determine that there is an intermediate value to be additionally accumulated to the memory address value #m--02 corresponding to the obtained partial sum i0$w$2+i1$w$1. In this case, the electronic apparatus 100 may not transmit the partial sum i0$w$2+i1$w$1 stored in the third address value #b-02, 125-2 of the buffer to a memory, but may continue storing in the third address value #b-02, 125-2.

The electronic apparatus 100 can continuously store the intermediate value i1$w$2 stored in the first address value 125-0 of the buffer directly to the first address value 125-0 of the buffer without directly transmitting the same to the memory 110. A detailed description of the intermediate value i1$w$2 is the same as the partial sum i0$w$2+i1$w$1, and thus, a redundant description will be omitted.

Referring to Table 2010, the electronic apparatus 100 can transmit only the partial sum i0$w$1+i1$w$0 to the memory 110 after the first stage 600-1-1 of the first phase 600-1, and the memory 110 can store the partial sum i0$w$1+i1$w$0 in the address value #m-01 of the memory corresponding to the partial sum i0$w$1+i1$w$0.

After transmitting the partial sum i0$w$1+i1$w$0 to the memory 110 (after receiving a control signal that the memory stores the partial sum i0$w$1+i1$w$0), the electronic apparatus 100 may delete the partial sum i0$w$1+i1$w$0 stored in the second address value #b-01, 125-1 of the buffer and the memory address value #m-01 corresponding to the partial sum i0$w$1+i1$w$0 from the second address value #b-01, 125-1 of the buffer. The memory address value #m-01 corresponding to the partial sum i0$w$1+i1$w$0 does not need to be stored in the buffer since there is no intermediate value to be additionally accumulated.

Referring to FIGS. 19 and 20, it is described that there are three address values of a buffer, but an address value of a buffer may vary according to examples.

Specifically, the number of address values of the buffer can vary depending on the size of the output data. Since the number of the convolution calculations can be determined based on the size of the output data, the electronic apparatus 100 can obtain the minimum number of buffers or the minimum number of address values of the buffer based on the size of the output data. For example, the minimum buffer in the output data of 5*5 can be 10.

Figure 21:
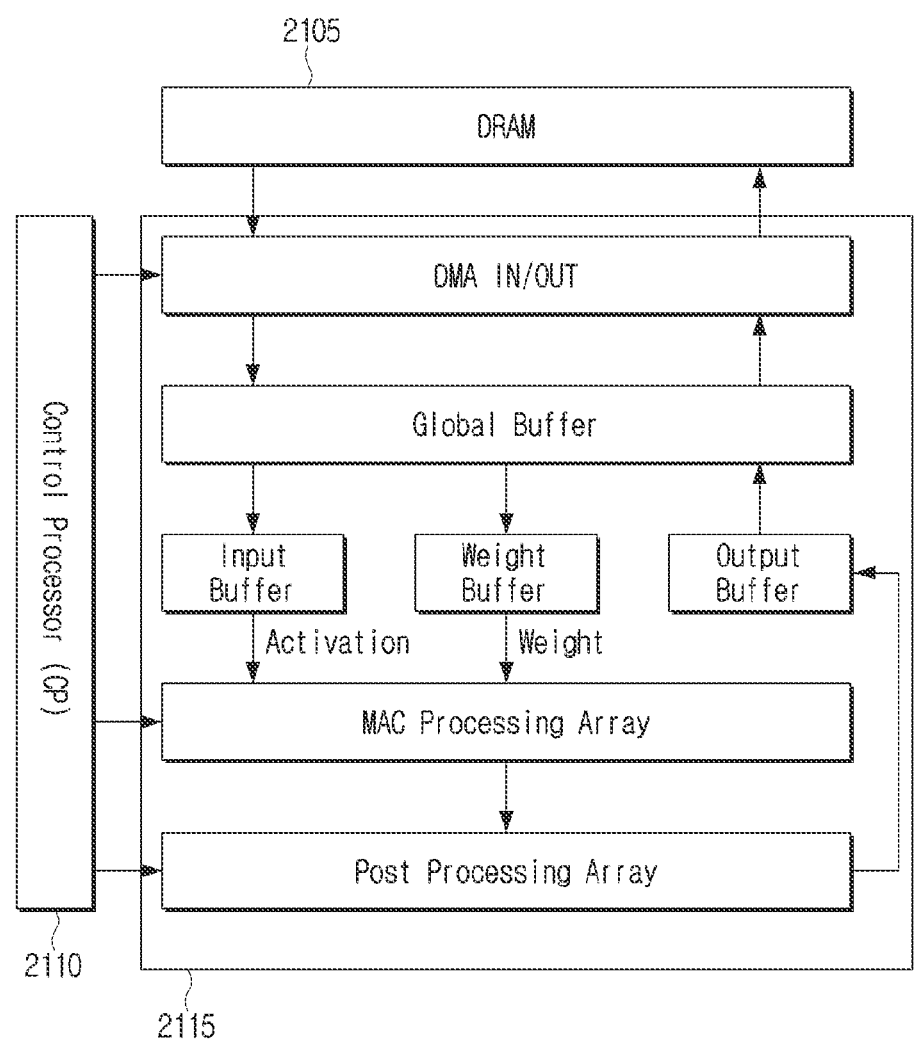
FIG. 21 illustrates a hardware diagram according to an embodiment.

FIG. 21 illustrates a hardware diagram according to an embodiment.

In FIG. 21, the electronic apparatus 100 may include a dynamic random access memory (DRAM) 2105, a control processor 2110, and a calculation module 2115.

The electronic apparatus 100 can process the convolution calculation and the deconvolution calculation in a MAC processing array (MPA). Therefore, a dedicated hardware for each calculation may not be necessary. The convolution calculation and the deconvolution calculation can be processed in a MAC processing array, and a non-linear calculation (e.g.: rectified linear unit (ReLU) and Elementwise sum (ESum)) can be processed in the post processing array (PPA) using the result processed in the MAC processing array.

The electronic apparatus 100 can read a value stored in the DRAM (external memory) through direct memory access (DMA). The data read through the DMA may be input data of a first layer of a deep neural network, input data of a middle layer, and a weight value.

The electronic apparatus 100 can read input data, intermediate result data (intermediate values), filter data from the DRAM, and store the same in a global buffer which is an internal memory (on-chip memory).

The electronic apparatus 100 can transfer data stored in the global buffer received through the DMA using the input buffer and the weight buffer to the MAC processing array and the post processing array.

The electronic apparatus 100 can transmit the data of which calculation operation ends in the MAC processing array and the post processing array to the output buffer, which may store the corresponding data in the global buffer. The data stored in the global buffer may be transmitted to the DRAM through the DMA.

The control processor 2110 can control the calculation module 2115 based on information required for the calculation (input/output activation size, size of a kernel, stride, a type of calculation, or the like) and information related to the DMA operation (data address, size, etc.).

Figure 22:
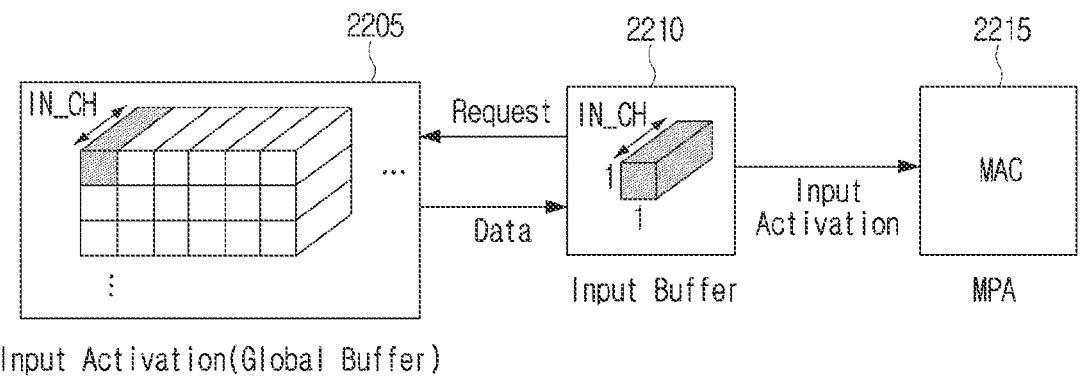
FIG. 22 illustrates moving of input activation according to an embodiment.

FIG. 22 illustrates moving of input activation according to an embodiment.

Figure 23:
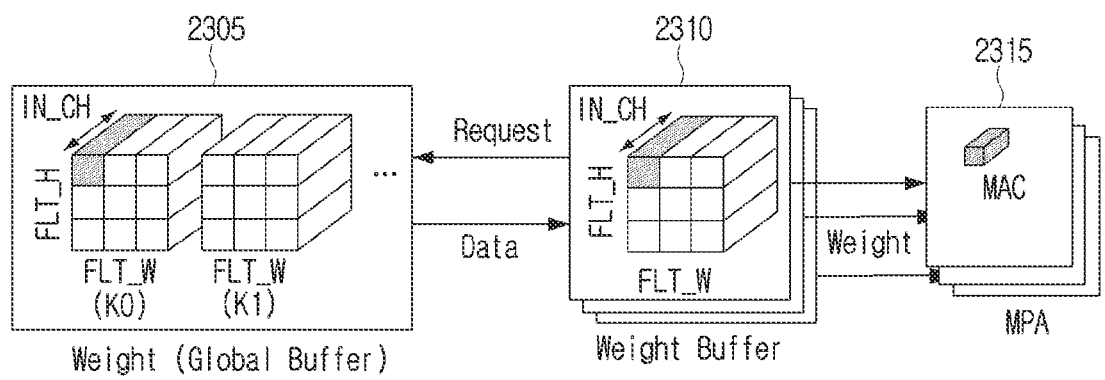
FIG. 23 illustrates moving of a weight value according to an embodiment.

FIG. 23 illustrates moving of a weight value according to an embodiment.

Figure 24:
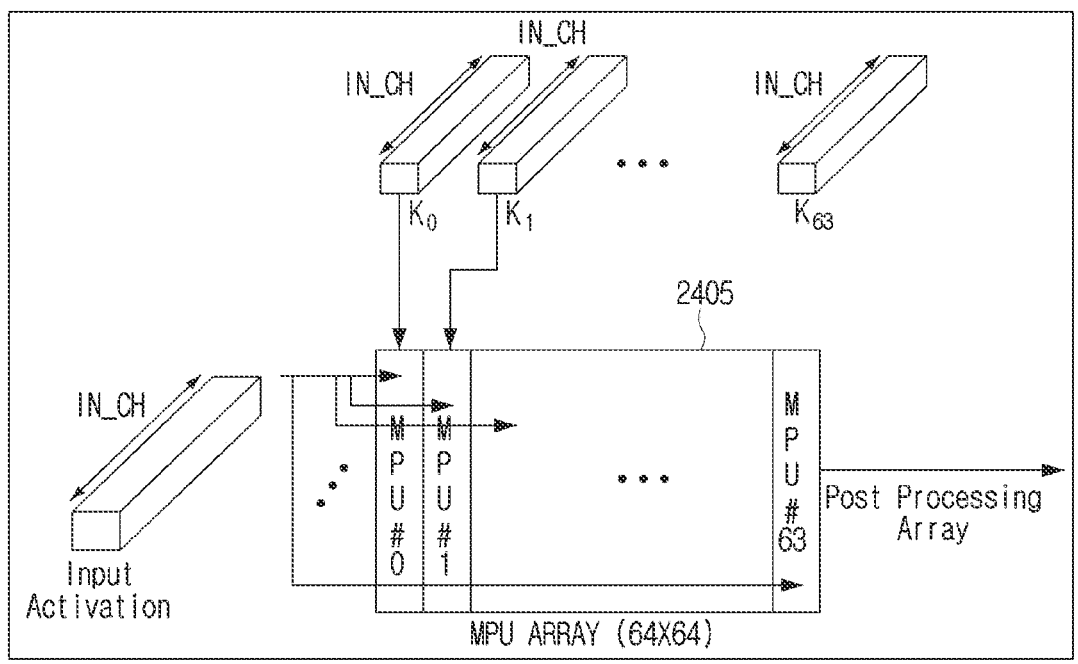
FIG. 24 illustrates an operation of a multiply and accumulate (MAC) processing array according to an embodiment.

FIG. 24 illustrates an operation of a MAC processing array according to an embodiment.

In FIG. 22, the MAC processing array 2215 is configured as a one-dimensional matrix of a MAC processing unit for processing a MAC calculation for convolution calculation and deconvolution calculation.

In each MPU, input activation 2205 data can be input from an input buffer 2210, and weight data can be input from a weight buffer. The data transmitted from the input buffer can be shared with each MPU.

In FIG. 23, weight data 2305 from a weight buffer 2310 may be a different value for each MPU.

Input activation and weight to input to one MPU are illustrated in FIG. 23. A dimension of the input activation and the weight can be equal. For example, if the size (x, y, z) of the input activation is 100×100-64, the data of 1×1×64 can be input to the MPA 2315 over a total of 100 times.

In FIG. 24, assuming one output is generated in one MPU and n MPUs include an array 2405, a total of N outputs can be generated at MPA. Each MPU uses different weights so that each output can correspond to an output channel in output activation.

Figure 25:
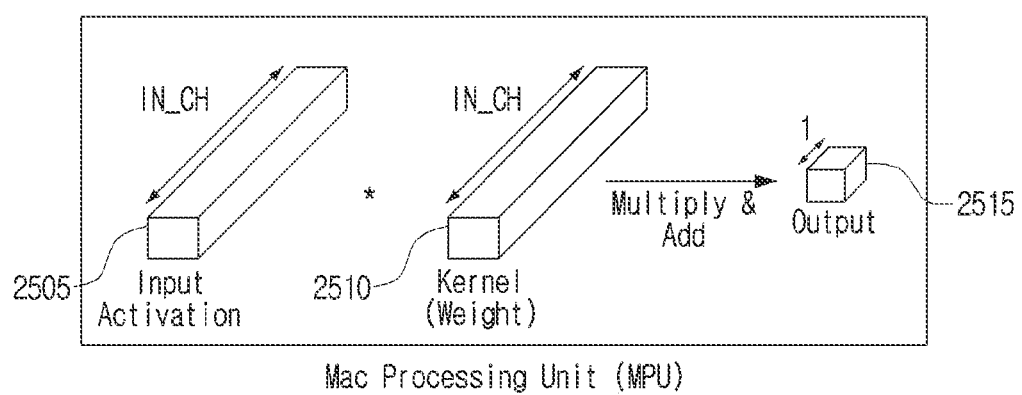
FIG. 25 illustrates a unit calculation operation of a MAC processing unit (MPU) according to a first embodiment.

FIG. 25 illustrates a unit calculation operation of an MPU according to a first embodiment.

In FIG. 25, in one MPU, the input activation 2505 can be input from the input buffer in the form of 1×1×IN_CH, and one Kernel (filter) 2510 can also receive 1×1×IN_CH of the same size from the weight buffer. The two pieces of input data may be multiplied with data corresponding to a location of each other, and the electronic apparatus 100 may obtain output data 2515.

Figure 26:
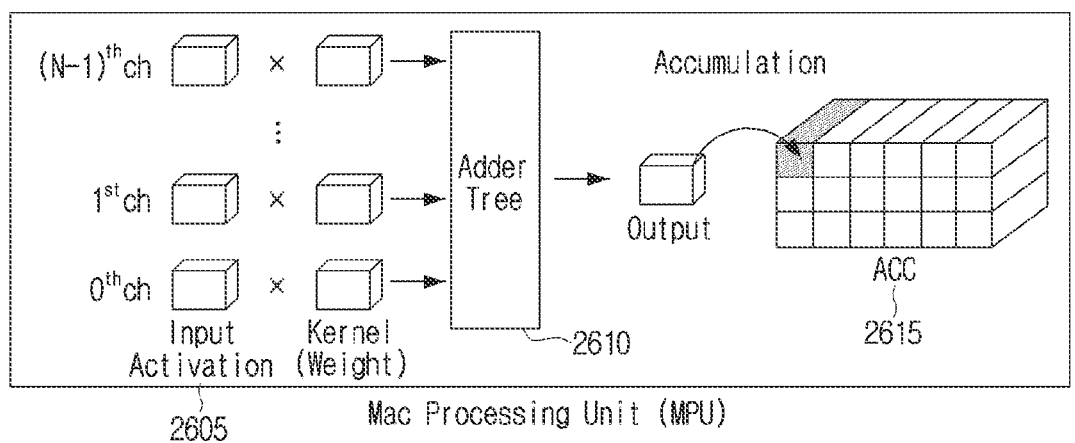
FIG. 26 illustrates a unit calculation operation of an MPU according to a second embodiment.

FIG. 26 illustrates a unit calculation operation of an MPU according to a second embodiment.

In FIG. 26, multiplication results as many as the number of IN_CHs 2605 can be generated, and all multiplication results can be input to an adder tree 2610 inside the MPU. In the adder tree 2610, one output can be generated by adding all the multiplication results of the input IN_CH 2605. Multiplication and addition, the main calculations of the MPU, can be accomplished through the above process. In the case of convolution calculation, the calculation may be 1×1×IN_CH*1×1×IN_CH=1×1×1. The calculated output can be stored in a storage space accumulator (ACC) 2615 inside the MPA. In the ACC 2615 capable of storing several results, an intermediate result value partial sum can be stored, and a cumulative number and an accumulated position can be determined according to the type of calculation, the kernel size, and the stride. If the intermediate result value is stored by a previous calculation, the electronic apparatus 100 can store again the partial sum which is calculated by adding a newly obtained intermediate result value. When the final output is stored in the ACC 2615 through several accumulations, all the final output stored in the ACC 2615 can be transferred to the post processing array, and the electronic apparatus 100 can perform a non-linear operation.

Figure 27:
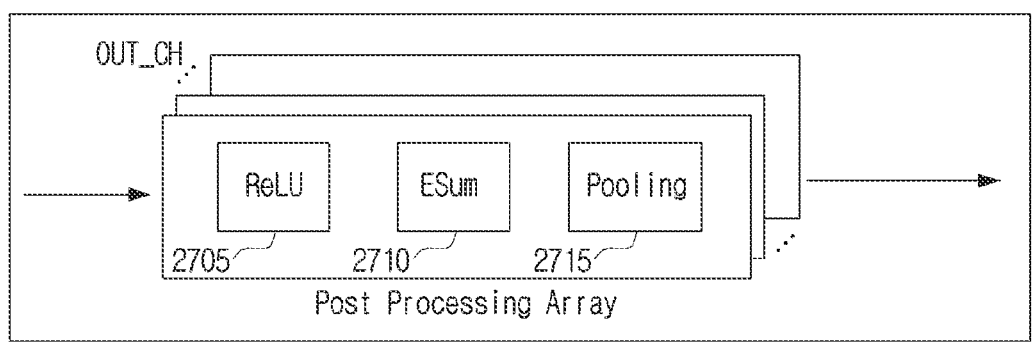
FIG. 27 illustrates an operation of a post processing array according to an embodiment.

FIG. 27 illustrates an operation of a post processing array according to an embodiment.

In FIG. 27, the post processing array calculation unit may be part of processing a non-linear layer that is performed after the MAC calculation. Since the partial sum is calculated in the MAC processing array, both the resultant outputs of convolution calculation and the deconvolution can be commonly performed by the MAC processing array. A non-linear calculation can be performed in the post processing array calculation unit, and may representatively include ReLU 2705, ESum 2710 and Pooling 2715, for example. Similar to the MPA, there may be a post processing unit (PPU) for calculating an output corresponding to one output channel, and the corresponding unit can be arranged in parallel to form an array shape. Accordingly, an array shape of MPA and PPA can be the same. For example, N outputs can be output in parallel at the MPA including N MPUs, and the PPA can also generate N outputs by receiving N inputs. The electronic apparatus 100 can transmit the final output completing the post processing to the output buffer. The output buffer can make a writing request for the input output to an address of the global buffer set by the control processor. Pooling 2715 may indicate resizing the convolution layer to get a new layer.

FIG. 28 illustrates a mathematical equation used in convolution calculation or deconvolution calculation.

Equation 2805 may be used to obtain an intermediate value of a convolution calculation. O^* may be an intermediate result calculated by the MAC calculation of 1×1× IN_CH, I may be the input activation, and W may be a weight (filter data). F_W may be the horizontal size of the filter, and F_H may be the height of the filter. The part corresponding to [ ][ ] may be coordinate information. For example, [x+i][y+j], [x][y], and [F_W−i][F_H−j] may refer to coordinate information.

Equation 2810 may be used to obtain an intermediate value of a convolution calculation when the stride is 2 or more. The electronic apparatus 100 may perform the calculation and store the same in ACC only when the coordinates of O^*[(x+i)/(STR_X)][(y+j)/(STR_Y)] are integers. Here, STR_X may indicate a stride in the x-axis direction, and STR_Y may mean a stride in the y-axis direction. If the coordinates of O^*[(x+i)/(STR_X)][(y+j)/(STR_Y)] are not integers, the electronic apparatus 100 may not perform an calculation operation and an operation of storing in ACC. As a result, the electronic apparatus 100 may obtain a final output by repeating and accumulating as much as the filter size.

Equation 2815 may be used in a deconvolution calculation operation. Specifically, the intermediate result value (O^*[x+STR_X+i][y+STR_Y+j]) can be obtained by multiplying input activation and weights.

Figure 29:
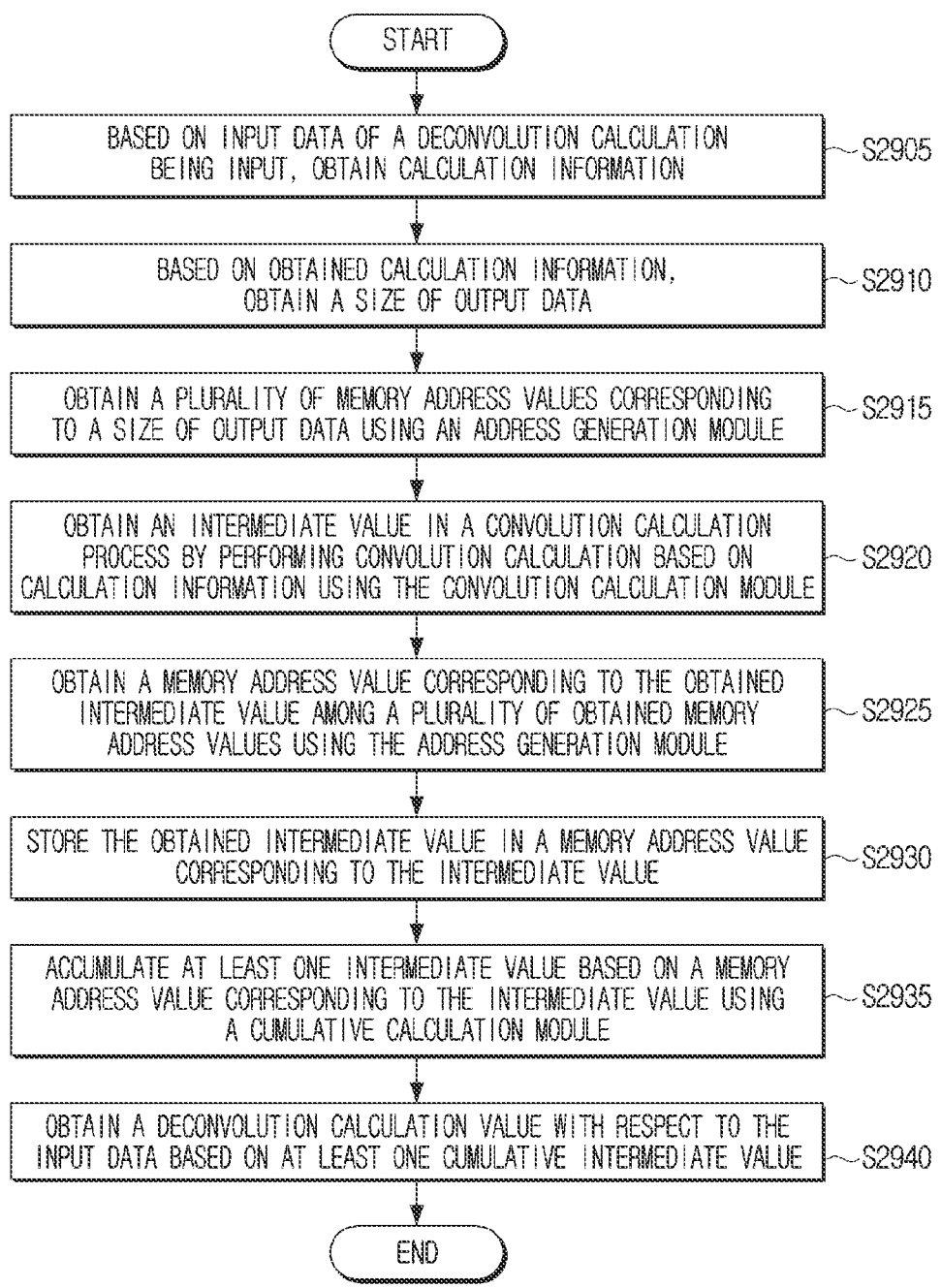
FIG. 29 illustrates a method for controlling an electronic apparatus according to an embodiment.

FIG. 29 illustrates a method for controlling an electronic apparatus according to an embodiment.

Referring to FIG. 29, a controlling method of an electronic apparatus includes, based on deconvolution calculation input data (input data using at the deconvolution calculation or input data for calculating the deconvolution) being input, obtaining calculation information in step S2905, based on obtained calculation information, obtaining a size of output data in step S2910, obtaining a plurality of memory address values corresponding to a size of output data using an address generation module 123 in step S2915, obtaining an intermediate value in a convolution calculation process by performing convolution calculation based on calculation information in step S2920, obtaining a memory address value corresponding to an obtained intermediate value among a plurality of obtained memory address values using an address generation module 123 in step S2925, storing an obtained intermediate value in a memory address value corresponding to the intermediate value in step S2930, accumulating at least one intermediate value based on a memory address value corresponding to the intermediate value using a cumulative calculation module 124 in step S2935 and obtaining a deconvolution calculation value with respect to input data based on at least one cumulative intermediate value in step S2940.

Storing the obtained intermediate value in a memory address value corresponding to the intermediate value in step S2930 may include storing a first intermediate value in the memory 110 based on the first memory address value corresponding to the first intermediate value obtained in a convolution calculation process, based on a second memory address value corresponding to a second intermediate value obtained in a convolution calculation process being identical to the first memory address value, obtaining a partial sum by accumulating the first intermediate value and the second intermediate value using the cumulative calculation module 124, and storing the obtained partial sum in the memory 110 based on the first memory address value.

The calculation information can include at least one of the size of the input data, the size of the filter data used in the deconvolution calculation, the size of the stride used for the convolution calculation, and the calculation order information corresponding to the first intermediate value and the obtaining the memory address value corresponding to the obtained intermediate value in step S2925 may obtain the first memory address value based on the calculation information by using the address generation module 123.

Obtaining a memory address value corresponding to the obtained intermediate value in step S2925 can include obtaining a first memory address value corresponding to the first intermediate value obtained of the plurality of memory address values obtained based on the calculation order information corresponding to the first intermediate value.

Storing the obtained intermediate value to a memory address value corresponding to the intermediate value in step S2930 can include storing the second intermediate value in the second memory address value based on the second memory address value corresponding to the second intermediate value obtained in the convolution calculation process not being identical to the first memory address value.

Obtaining the intermediate value in step S2920 can include obtaining a plurality of intermediate values by performing convolution calculation sequentially for the input data with a plurality of weights included in the horizontal axis line of the filter data used in the deconvolution calculation.

Accumulating at least one intermediate value in step S2935 can include accumulating at least a part of the plurality of intermediate values using the cumulative calculation module 124, and the number of the accumulation can be determined based on the calculation information.

Storing the obtained intermediate value to the memory address value corresponding to the intermediate value in step S2930 can include storing the intermediate value in the internal buffer 125 based on the address value of the internal buffer 125 corresponding to the intermediate value, and identifying whether there is an additional intermediate value to be accumulated calculated in the intermediate value, and if it is identified that there is no additional intermediate value, storing the intermediate value stored in the internal buffer 125 in the memory 110.

The controlling method may further include determining a size of an internal buffer in which an intermediate value is to be stored based on calculation information.

The deconvolution calculation value may be obtained without using a deconvolution calculation module.

The method of controlling the electronic apparatus as illustrated in FIG. 29 can be executed in the electronic apparatus having a configuration of FIG. 1 and can be executed in an electronic apparatus including other configurations.

Methods according to the embodiments as described above may be implemented as an application format installable in an existing electronic apparatus and may be implemented as software upgrade or hardware upgrade for an existing electronic apparatus.

Embodiments described above may be performed through an embedded server provided in an electronic apparatus, or an external server of at least one electronic apparatus and a display device.

Embodiments may be implemented in software, including instructions stored on machine-readable storage media readable by a machine (e.g., a computer). An apparatus may call instructions from the storage medium, and execute the called instruction, including an electronic apparatus, such as electronic apparatus A. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium, which expression denotes that a storage medium is tangible, and does not distinguish the case in which a data is semi-permanently stored in a storage medium from the case in which a data is temporarily stored in a storage medium.

The method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™) or distributed online directly. In the case of online distribution, at least a portion of the computer program product may be at least temporarily stored or temporarily generated in a server of the manufacturer, a server of the application store, or a machine-readable storage medium such as memory of a relay server.

The respective elements (e.g., module or program) mentioned above may include a single entity or a plurality of entities. At least one element or operation from of the corresponding elements mentioned above may be omitted, or at least one other element or operation may be added. Alternatively or additionally, a plurality of components may be combined to form a single entity. In this case, the integrated entity may perform functions of at least one function of an element of each of the plurality of elements in the same manner as or in a similar manner to that performed by the corresponding element from of the plurality of elements before integration. The module, a program module, or operations executed by other elements according to embodiments may be executed consecutively, in parallel, repeatedly, or heuristically, or at least some operations may be executed according to a different order, may be omitted, or the other operation may be added thereto.

The foregoing embodiments and advantages are merely examples and are not to be understood as limiting the disclosure. The present disclosure may be readily applied to other types of devices. The description of the embodiments is intended to be illustrative, and not to limit the scope of the claims, and many alternatives, modifications, and variations will be apparent to those skilled in the art.

While the disclosure has been particularly shown and described with reference to certain embodiments thereof, it will be understood by those skilled in the art that various changes in form and details may be made therein without departing from the scope of the subject matter as defined by the appended claims and their equivalents.

What is claimed is:

1. An electronic apparatus comprising:
a memory; and
a processor connected to the memory configured to control the electronic apparatus,
wherein the processor is configured to:
obtain calculation information based on input data of a deconvolution calculation being input,
obtain a size of output data based on the obtained calculation information,
obtain a plurality of memory address values corresponding to a size of the output data using an address generation module,
perform convolution calculation based on the calculation information using a convolution calculation module to obtain an intermediate value in the convolution calculation process, obtain a memory address value corresponding to the obtained intermediate value of the plurality of obtained memory addresses using the address generation module, store the obtained intermediate value in the memory address value corresponding to the intermediate value, accumulate at least one intermediate value based on the memory address value corresponding to the intermediate value using a cumulative calculation module, and obtain a deconvolution calculation value with respect to the input data based on the accumulated at least one intermediate value.

2. The electronic apparatus of claim 1, wherein the processor is further configured to:

based on a first memory address value corresponding to a first intermediate value obtained in the convolution calculation process, store the first intermediate value in the memory, and based on a second memory address value corresponding to a second intermediate value obtained in the convolution calculation process being identical to the first memory address value, obtain a partial sum by accumulating the first intermediate value and the second intermediate value using the cumulative calculation module, and store the obtained partial sum in the memory based on the first memory address value.

3. The electronic apparatus of claim 2, wherein the calculation information comprises at least one of a size of the input data, a size of filter data used in the deconvolution calculation, a size of a stride used in the convolution calculation, and calculation order information corresponding to the first intermediate value, and wherein the processor is further configured to obtain the first memory address value based on the calculation information using the address generation module.

4. The electronic apparatus of claim 3, wherein the processor is further configured to obtain a first memory address value corresponding to the obtained first intermediate value of the plurality of obtained memory address values based on the calculation order information corresponding to the first intermediate value.

5. The electronic apparatus of claim 2, wherein the processor is further configured to, based on a second memory address value corresponding to the second intermediate value obtained in the convolution calculation process not being identical to the first memory address value, store the second intermediate value in the second memory address value.

6. The electronic apparatus of claim 1, wherein the processor is further configured to obtain a plurality of intermediate values by sequentially performing a convolution calculation of the input data with a plurality of weights included in a horizontal line of filter data used in the deconvolution calculation.

7. The electronic apparatus of claim 6, wherein the processor is further configured to accumulate at least a part of the plurality of intermediate values using a cumulative calculation module, and wherein an amount of the accumulated at least part of the plurality of intermediate values is determined based on the calculation information.

8. The electronic apparatus of claim 1, wherein the processor is further configured to:

store the intermediate value in an internal buffer based on an address value of the internal buffer corresponding to the intermediate value, identify whether there is an additional intermediate value to be cumulatively calculated in the intermediate value, and store the intermediate value in the internal buffer in the memory, based on identifying that there is no additional intermediate value.

9. The electronic apparatus of claim 8, wherein the processor is further configured to determine a size of the internal buffer in which the intermediate value is to be stored based on the calculation information.

10. The electronic apparatus of claim 1, wherein the deconvolution calculation value is obtained without using a deconvolution calculation module.

11. A method of controlling an electronic apparatus, the method comprising:

obtaining calculation information based on input data of deconvolution calculation being input;

obtaining a size of output data based on the obtained calculation information;

obtaining a plurality of memory address values corresponding to a size of the output data using an address generation module;

performing convolution calculation based on the calculation information using a convolution calculation module in the convolution calculation process to obtain an intermediate value in the convolution calculation process;

obtaining a memory address value corresponding to the obtained intermediate value of the plurality of obtained memory addresses using the address generation module;

storing the obtained intermediate value in the memory address value corresponding to the intermediate value;

accumulating at least one intermediate value based on the memory address value corresponding to the intermediate value using a cumulative calculation module; and obtaining a deconvolution calculation value with respect to the input data based on the accumulated at least one intermediate value.

12. The method of claim 11, wherein storing the obtained intermediate value in a corresponding memory address value comprises:

based on a first memory address value corresponding to a first intermediate value obtained in the convolution calculation process, storing the first intermediate value in the memory, based on a second memory address value corresponding to a second intermediate value obtained in the convolution calculation process being identical to the first memory address value, obtaining a partial sum by accumulating the first intermediate value and the second intermediate value using the cumulative calculation module, and storing the obtained partial sum in the memory based on the first memory address value.

13. The method of claim 12, wherein the calculation information comprises at least one of a size of the input data, a size of filter data used in the deconvolution calculation, a size of a stride used in the convolution calculation, and calculation order information corresponding to the first intermediate value, and wherein obtaining the memory address value corresponding to the obtained intermediate value comprises obtaining the first memory address value based on the calculation information using the address generation module.

14. The method of claim 13, wherein obtaining the memory address value corresponding to the obtained intermediate value comprises obtaining a first memory address value corresponding to the obtained first intermediate value of the plurality of obtained memory address values based on calculation order information corresponding to the first intermediate value.

15. The method of claim 12, wherein storing the obtained intermediate value in a memory address value corresponding to the intermediate value comprises, based on a second memory address value corresponding to the second intermediate value obtained in the convolution calculation process not being identical to the first memory address value, storing the second intermediate value in the second memory address value.

16. The method of claim 11, wherein obtaining the intermediate value comprises obtaining a plurality of intermediate values by sequentially performing convolution calculation of the input data with a plurality of weights included in a horizontal line of filter data used in the deconvolution calculation.

17. The method of claim 16, wherein accumulating the at least one intermediate value comprises accumulating at least a part of the plurality of intermediate values using a cumulative calculation module, and wherein an amount of the accumulated at least part of the plurality of intermediate values is determined based on the calculation information.

18. The method of claim 11, wherein storing the obtained intermediate value in the memory address value corresponding to the intermediate value comprises:
    storing the intermediate value in an internal buffer based on an address value of the internal buffer corresponding to the intermediate value,
    identifying whether there is an additional intermediate value to be cumulatively calculated in the intermediate value, and
    based on identifying that there is no additional intermediate value, storing the intermediate value in the internal buffer in the memory.

19. The method of claim 18, further comprising:
    determining a size of the internal buffer in which the intermediate value is to be stored based on the calculation information.

20. The method of claim 11, wherein the deconvolution calculation value is obtained without using a deconvolution calculation module.

* * * * *